United States Patent
Yamauchi et al.

(10) Patent No.: US 9,292,339 B2
(45) Date of Patent: Mar. 22, 2016

(54) MULTI-CORE PROCESSOR SYSTEM, COMPUTER PRODUCT, AND CONTROL METHOD

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Tetsuya Saka, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 566 days.

(21) Appl. No.: 13/625,375

(22) Filed: Sep. 24, 2012

(65) Prior Publication Data

US 2013/0024865 A1    Jan. 24, 2013

Related U.S. Application Data

(63) Continuation of application No. PCT/JP2010/055288, filed on Mar. 25, 2010.

(51) Int. Cl.
G06F 9/46 (2006.01)
G06F 9/48 (2006.01)
G06F 9/52 (2006.01)

(52) U.S. Cl.
CPC ............... *G06F 9/4843* (2013.01); *G06F 9/52* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 7,886,172 B2* | 2/2011 | Bose et al. | | 713/324 |
| 8,020,163 B2* | 9/2011 | Nollet et al. | | 718/104 |
| 8,214,618 B2* | 7/2012 | Jeong | | 711/170 |
| 8,336,056 B1* | 12/2012 | Gadir | | 718/104 |
| 8,347,301 B2* | 1/2013 | Li et al. | | 718/104 |
| 8,615,647 B2* | 12/2013 | Hum et al. | | 713/100 |
| 8,661,440 B2* | 2/2014 | Cho | | 718/100 |
| 2005/0228967 A1 | 10/2005 | Hirairi | | |
| 2007/0204268 A1* | 8/2007 | Drepper | | 718/102 |
| 2008/0077928 A1* | 3/2008 | Matsuzaki et al. | | 718/104 |
| 2008/0115010 A1* | 5/2008 | Rothman et al. | | 714/10 |

(Continued)

FOREIGN PATENT DOCUMENTS

JP    2-033650    2/1990
JP    6-1464      1/1994

(Continued)

OTHER PUBLICATIONS

Japanese International Preliminary Report on Patentability for PCT/JP2010/055288 (11 pages).

(Continued)

*Primary Examiner* — Kenneth Tang
(74) *Attorney, Agent, or Firm* — Staas & Halsey LLP

(57) ABSTRACT

A multi-core processor system includes a core configured to determine whether a task to be synchronized with a given task is present; identify among cores making up the multi-core processor and upon determining that a task to be synchronized with the given task is present, a core to which no non-synchronous task that is not synchronized with another task has been assigned, and identify among cores making up the multi-core processor and upon determining that a task to be synchronized with the given task is not present, a core to which no synchronous task to be synchronized with another task has been assigned; and send to the identified core, an instruction to start the given task.

6 Claims, 20 Drawing Sheets

(56) References Cited

U.S. PATENT DOCUMENTS

| | | | |
|---|---|---|---|
| 2010/0008197 A1 | 1/2010 | Ikemoto et al. | |
| 2010/0010671 A1 | 1/2010 | Miyamoto | |
| 2010/0058086 A1* | 3/2010 | Lee | 713/322 |
| 2011/0302589 A1* | 12/2011 | Aussagues et al. | 718/104 |

FOREIGN PATENT DOCUMENTS

| | | |
|---|---|---|
| JP | 9-282190 | 10/1997 |
| JP | 3429582 | 7/2003 |
| JP | 2005-267635 | 9/2005 |
| JP | 2007-233763 | 9/2007 |
| JP | 2008-15958 | 1/2008 |
| JP | 2010-020650 | 1/2010 |
| JP | 2010-20850 | 1/2010 |

OTHER PUBLICATIONS

Japanese Office Action of Japanese Patent Application No. 2012-506729 dated Oct. 22, 2013.

International Search Report for PCT/JP2010/055288, mailed Jun. 29, 2010.

Yuji Wada, "A Monitoring System of Parallel/Distributed Programming Language Sushi," The Information Processing Society of Japan, 1994, 5 pages.

* cited by examiner

FIG.3

| TASK FIELD (301) | SYNCHRONIZED TASK FIELD (302) | SYNCHRONIZATION SUSPEND EVENT FIELD (303) |
|---|---|---|
| TASK #0 | TASK #1 | complete |
| | TASK #2 | complete |
| TASK #1 | TASK #0 | - |
| | TASK #2 | sleep |
| TASK #2 | TASK #0 | - |
| | TASK #1 | sleep |
| TASK #3 | - | - |
| TASK #4 | TASK #6 | complete |
| TASK #5 | - | - |
| TASK #6 | TASK #4 | complete |
| | TASK #7 | complete |
| TASK #7 | TASK #6 | complete |
| TASK #8 | - | - |
| TASK #9 | - | - |
| ⋮ | ⋮ | ⋮ |

| CMODE_x[3:0] FIELD | | | | RATIO FIELD | |
|---|---|---|---|---|---|
| CMODE_x[3] | CMODE_x[2] | CMODE_x[1] | CMODE_x[0] | SHARED MEMORY FIELD | CACHE FIELD |
| 0 | 0 | 0 | 0 | 2 | 2 |
| 0 | 0 | 0 | 1 | 2 | 4 |
| 0 | 0 | 1 | 0 | 4 | 2 |
| 0 | 0 | 1 | 1 | 4 | 4 |
| ... | ... | ... | ... | ... | ... |

501 / 502 / 504 / 503 / 505

| CMODE[3:0] FIELD | | | | RATIO FIELD | |
|---|---|---|---|---|---|
| CMODE[3] | CMODE[2] | CMODE[1] | CMODE[0] | EXTERNAL BUS FIELD | CORE FIELD |
| 0 | 0 | 0 | 0 | 1 | 1 |
| 0 | 0 | 0 | 1 | 2 | 1 |
| 0 | 0 | 1 | 0 | 2 | 2 |
| 0 | 0 | 1 | 1 | 2 | 2 |
| ... | ... | ... | ... | ... | ... |

| TASK FIELD | RATIO FIELD | |
| --- | --- | --- |
| | SHARED MEMORY FIELD | CACHE FIELD |
| TASK #0 | 2 | 2 |
| TASK #1 | 2 | 2 |
| TASK #2 | 2 | 2 |
| TASK #3 | 4 | 4 |
| TASK #4 | 2 | 2 |
| TASK #5 | 4 | 4 |
| TASK #6 | 2 | 2 |
| TASK #7 | 2 | 2 |

MULTI-CORE PROCESSOR SYSTEM, COMPUTER PRODUCT, AND CONTROL METHOD

CROSS REFERENCE TO RELATED APPLICATIONS

This application is a continuation application of International Application PCT/JP2010/055288, filed on Mar. 25, 2010 and designating the U.S., the entire contents of which are incorporated herein by reference.

FIELD

The embodiment discussed herein is related to controlling task assignment to a multi-core processor.

BACKGROUND

In a conventional multi-core processor system, when a scheduler receives an instruction for the assignment of a task, the scheduler determines to which central processing unit (CPU) the task is to be assigned (see, e.g., Japanese Laid-Open Patent Publication Nos. H02-33650 and 2005-267635, and Japanese Patent No. 3429582). For example, one method of making such a determination is known where the scheduler identifies the CPU having the lowest load among CPUs making up the multi-core processor and assigns the task to the CPU having the lowest load.

Tasks include tasks that are synchronized with a different task and tasks that are not synchronized with a different task. For example, a task related to moving picture reproduction (hereinafter "moving picture reproducing task") starts a task concerning moving picture decoding (hereinafter "moving picture decoding task") and a task concerning audio decoding (hereinafter "audio decoding task"). A case is assumed where a moving picture decoding task is assigned to one CPU and an audio decoding task is assigned to a different CPU. To combine the result of moving picture decoding and the result of audio decoding when moving pictures are reproduced at 30 frames per second (FPS), a synchronizing process is carried out between the CPUs at a frequency of 30 times per second (see, e.g., Japanese Patent Application No. H06-1464).

However, a problem arises in that if a task that is not synchronized with either task is assigned to the CPU to which the moving picture decoding task is assigned or to the CPU to which the audio decoding task is assigned, a stand-by time arises because of execution of a synchronizing process. This stand-by time leads to an increase in the execution time for the non-synchronized task.

The stand-by time resulting from the synchronizing process can be reduced by increasing the frequency of a clock supplied to memory shared by the multi-core processor. However, power consumption by the shared memory accounts for a large percentage of the overall power consumption by the multi-core processor. For this reason, the frequency of a clock supplied to the shared memory cannot be increased in the multi-core processor, which poses another problem.

SUMMARY

According to an aspect of an embodiment, a multi-core processor system includes a core configured to determine whether a task to be synchronized with a given task is present; identify among cores making up the multi-core processor and upon determining that a task to be synchronized with the given task is present, a core to which no non-synchronous task that is not synchronized with another task has been assigned, and identify among cores making up the multi-core processor and upon determining that a task to be synchronized with the given task is not present, a core to which no synchronous task to be synchronized with another task has been assigned; and send to the identified core, an instruction to start the given task.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram of one example of a synchronization table 132;

FIG. 5 is an explanatory diagram of one example of a clock table 133;

FIG. 6 is an explanatory diagram of one example of a clock control table 134;

DESCRIPTION OF EMBODIMENTS

A preferred embodiment of a multi-core processor system, a control program, and a control method according to the present invention is described in detail below with reference to the accompanying drawings. The multi-core processor of the multi-core processor system according to the present embodiments is a processor that includes multiple cores. Provided the multi-core processor includes multiple cores, the multi-core processor may be a single processor with multiple cores or single-core processors connected in parallel. For simplicity, single-core processors connected in parallel are taken as an example in the present embodiment.

Figure 1:
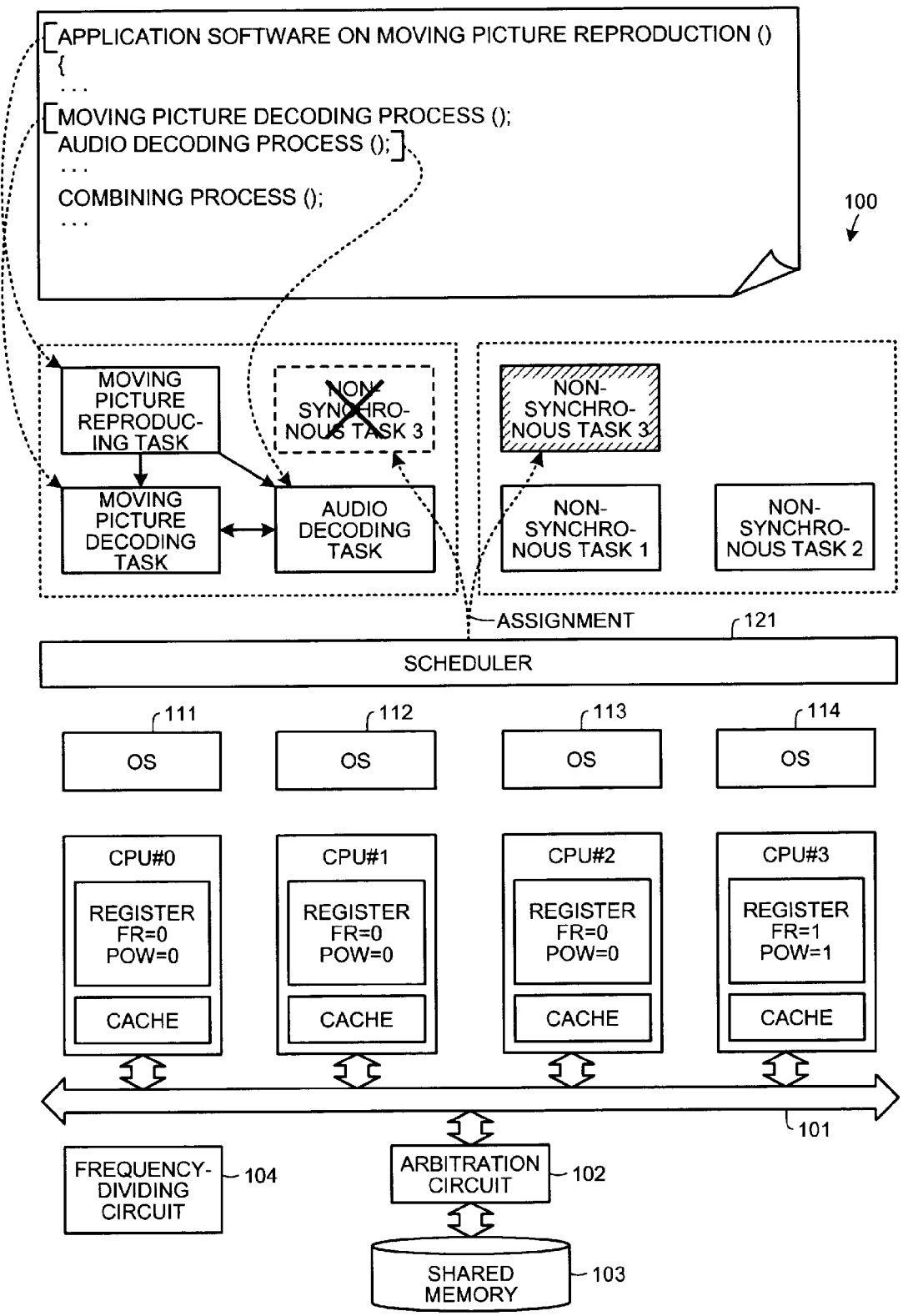
FIG. 1 is an explanatory diagram of an embodiment of the present invention.

FIG. 1 is an explanatory diagram of one embodiment of the present invention. For example, a moving picture reproducing task and a moving picture decoding task started by the moving picture reproducing task are assigned to a CPU #0,and an audio decoding task started by the moving picture reproducing task is assigned to the CPU #1.

The moving picture reproducing task is a process of an application related to moving picture reproduction, the moving picture decoding task is a moving picture decoding process, and the audio decoding task is an audio decoding process. The application related to moving picture reproduction carries out a combining process of combining the results of the decoding processes at a given interval. Therefore, the moving picture decoding task and the audio decoding task have to be synchronized with each other. A task to be synchronized with another task, e.g., the moving picture decoding task and audio decoding task, is referred to as a synchronous task.

A non-synchronous task 1 that is not synchronized with another task is assigned to a CPU #2,and a non-synchronous task 2 that is not synchronized with another task is assigned to a CPU #3.In this manner, a task not synchronized with another task is referred to as non-synchronous task.

When a scheduler 121 receives an instruction for assignment of a non-synchronous task 3, the scheduler 121 determines whether a task to be synchronized with the non-synchronous task 3 is present. In this case, the scheduler 121 determines that a task to be synchronized with the non-synchronous task 3 is not present. The scheduler 121 then identifies a CPU to which a synchronous task has not been assigned. A CPU to which a synchronous task has not been assigned means a CPU to which no task has been assigned and also means a CPU to which a non-synchronous task has been assigned. In this example, the CPUs #2 and #3 are each identified as a CPU to which a synchronous task has not been assigned. The scheduler 121 sends an instruction for the start of the non-synchronous task 3 to the CPU #2 identified by the scheduler 121. Hence, the non-synchronous task 3 is assigned to the CPU #2.

When receiving an instruction for the assignment of a synchronous task, the scheduler 121 identifies a CPU to which a non-synchronous task has not been assigned (in a process not depicted in FIG. 1). A CPU to which a non-synchronous task has not been assigned means a CPU to which no task has been assigned and also means a CPU to which a synchronous task has been assigned. Hence, the CPUs #1 and #2 are identified, and a synchronous task is assigned to one of the CPUs #1 and #2.

In this manner, control is carried out to prevent simultaneous assignment of a synchronous task and a non-synchronous task to the same CPU. This prevents an increase in the execution time for a non-synchronous task due to the stand-by time resulting from a synchronizing process and thereby, improves throughput.

Figure 2:
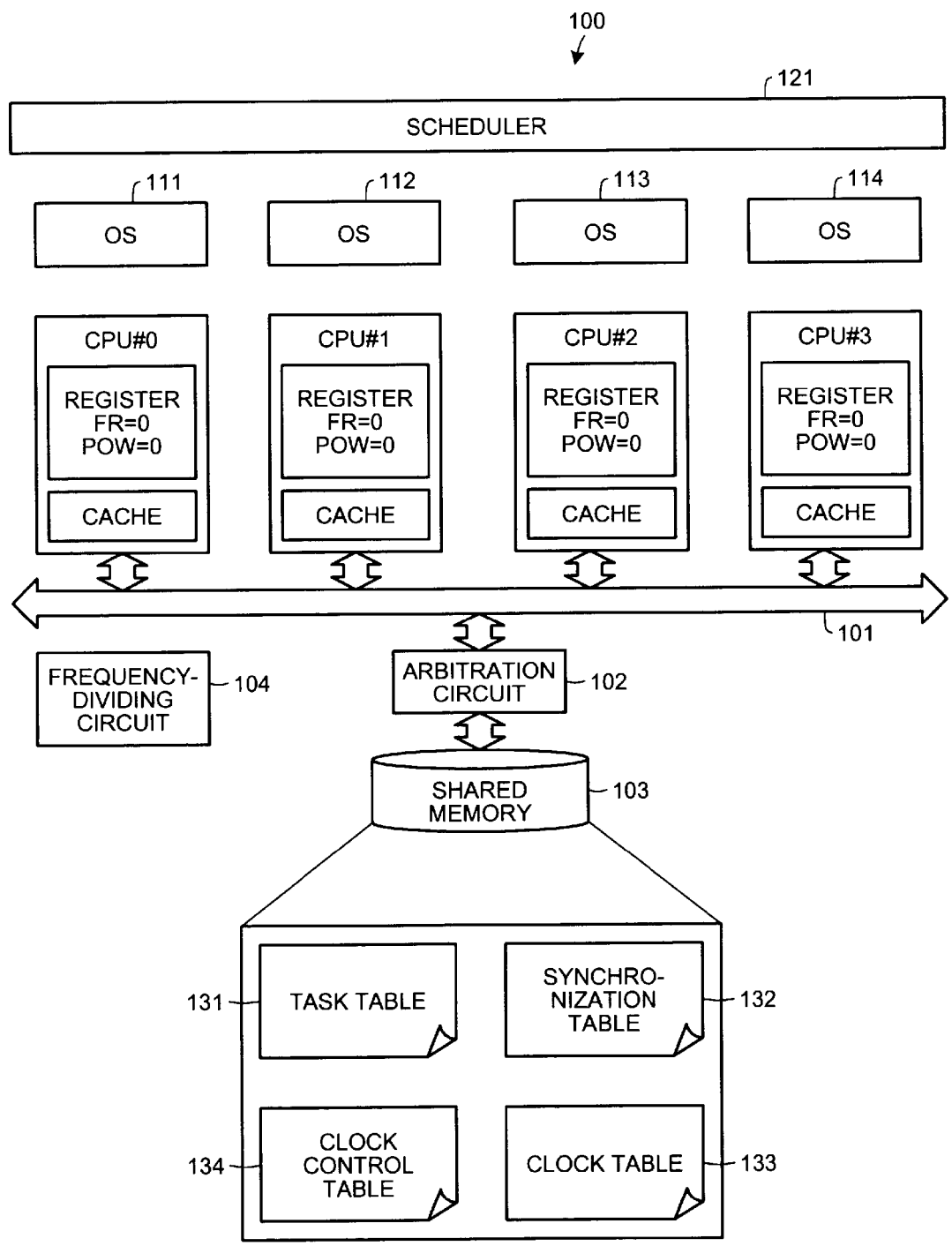
FIG. 2 is a block diagram of a hardware configuration of a multi-core processor system 100 according to this embodiment.

FIG. 2 is a block diagram of a hardware configuration of a multi-core processor system 100 according to this embodiment. In FIG. 2, the multi-core processor system 100 includes the CPUs #0 to #3, a arbitration circuit 102, shared memory 103, and a frequency-dividing circuit 104, respectively connected via a bus 101.

Each of the CPUs #0 to #2 has a core, a register, and cache. Each register has POW and FR. POW represents a register that indicates whether the operating system (OS) running on each CPU is in a power-saving mode. A POW registering 1 indicates that the OS is in the power-saving mode, while a POW registering 0 indicates that the OS is not in the power-saving mode.

FR represents a register that indicates whether a memory clock has been reduced. An FR registering 1 indicates that the memory clock has been reduced, while an FR registering 0 indicates that the memory clock has not been reduced. The memory clock is the clock supplied to the cache memory and to the shared memory 103.

The CPU #0 executes an OS 111, carries out overall control over the multi-core processor system 100, and executes an assigned task. The OS 111 is the master OS, and has the scheduler 121 that carries out control to determine to which CPU a task is to be assigned.

The scheduler 121 has a control program for carrying out control to prevent simultaneous assignment of a synchronous task and a non-synchronous task to the same CPU. The CPU #0, therefore, executes a process coded in the control program. The CPUs #1, #2, and #3 execute an OS 112, an OS 113, and an OS 114, respectively, and execute tasks assigned to the OSs. The OSs 112 to 114 are slave OSs. "A CPU to which a task is assigned" and "an OS to which a task is assigned" actually mean the same. Each of the OSs 111 to 114 has a power-saving mode and a normal mode. When making transition from the normal mode to the power-saving mode, each OS sets to 1, POW in the register of the CPU executing the OS.

The arbitration circuit 102 is the circuit that arbitrates access from the CPUs #0 to #3 to the shared memory 103. For example, the arbitration circuit 102 enters into a request buffer, access requests from tasks assigned to the CPUs #0 to #3; extracts access requests in the order of entry into the request buffer; and permits each extracted request. The arbitration circuit 102 inputs a signal indicative of which CPU is permitted access (SEL [1:0], which will be described later) to the frequency-dividing circuit 104.

The shared memory 103 is memory shared in the multi-core processor. The shared memory 103 stores therein a task table 131, a synchronization table 132, a clock table 133, and a clock control table 134. The shared memory 103 has read-only memory (ROM), random access memory (RAM), and flash ROM.

For example, the flash ROM stores therein programs of OSs, the ROM stores therein application programs, and the RAM is used as a work area for the CPUs #0 to #3. Programs stored in the shared memory 103 are loaded onto the CPUs to cause each CPU to execute processes coded in the programs.

The task table 131 includes information that indicates the CPU to which each task is assigned and the task that the CPU is executing. After being started up, the OSs read the contents of a process table and store the table contents in the cache of the CPU. Having assigned a task, the scheduler 121 enters the assigned task into the task table 131. When task switching occurs, the OSs enter into the process table, the tasks that have entered an execution state.

Having rewritten the contents of the task table 131, the OSs execute a snoop process to update each of the task tables 131 stored in the cache of each of the CPUs. The scheduler 121 can detect the occurrence of task dispatching or task switching by determining whether the contents of the task table 131 change. The synchronization table 132 will be described in detail with reference to FIG. 3.

FIG. 3 is an explanatory diagram of one example of the synchronization table 132. The synchronization table 132 is a table that indicates the tasks that are to be synchronized. The synchronization table 132 has a task field 301, a synchronized task field 302, and a synchronization suspend event field 303. The task field 301 and the synchronized task field 302 include task names. The task corresponding to a task name included in the task field 301 (hereinafter "task name in the task field 301") is a synchronous task if a task name is included in the synchronized task field 302 of the same record, and is a non-synchronous task if no task name is included in the synchronized task field 302 of the same record.

For example, if a task name in the task field 301 is task #0 and, a task #1 and a task #2 are included in the synchronized task field 302, the task #0 is synchronized with the task #1 and with the task #2. For example, if a task name in the task field 301 is task #3 and no task name is entered in the synchronized task field 302, the task #3 is a non-synchronous task. The tasks #0 to #2, a task #4, a task #6, and a task #7 are synchronous tasks, and the task #3, a task #5, a task #8, and a task #9 are non-synchronous tasks.

In a given state, the task corresponding to a task name included in the synchronized task field 302 (hereinafter "task name in the synchronized task field 302") may suspend synchronization with the task corresponding to the task name in the task field 302 of the same record. The name of the given state is included in the synchronization suspend event field 303. If the task name in the task field 301 is the task #0, the task #1 and the task #2 are included in the synchronized task field 302, and "complete" is included in the synchronization suspend event field 303 for the tasks #1 and #2, this means that when the task #1 enters a state of "complete", the task #0 and the task #1 suspend synchronization, and when the task #2 enters a state of "complete", the task #0 and the task #2 suspend synchronization. "Complete" represents a completed state, and "sleep" represents a sleep state. A normal operating state is referred to as "operating state".

At the time of design, the application designer uses a compiler to analyze whether each task is synchronous or non-synchronous and thereby creates the synchronization table 132.

In FIG. 2, the frequency-dividing circuit 104 serves as a clock supply source that supplies a clock to the CPUs #0 to #3, the caches of the CPUs, the bus 101, and the shared memory 103. In FIG. 2, connection lines connecting the component units to the frequency-dividing circuit 104 are omitted.

Figure 4:
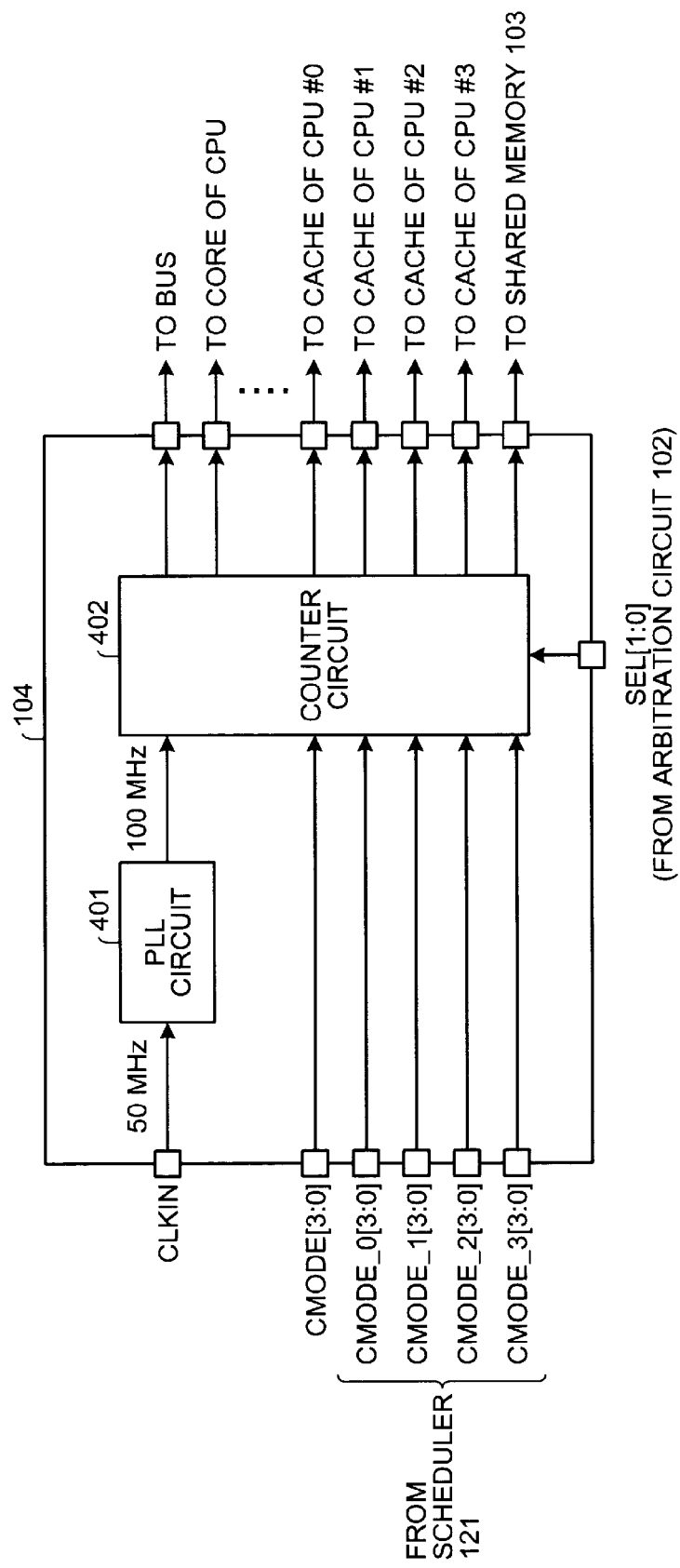
FIG. 4 is an explanatory diagram of one example of a frequency-dividing circuit 104.

FIG. 4 is an explanatory diagram of one example of the frequency-dividing circuit 104. The frequency-dividing circuit 104 has a PLL circuit 401 that multiplies a clock and a counter circuit 402 that divides a clock according to frequency. The frequency-dividing circuit 104 receives input of CLKIN, CMODE[3:0], CMODE_0[3:0], CMODE_1[3:0], CMODE_2[3:0], and CMODE_3[3:0], and outputs clocks to each of the component units.

For example, a clock from an oscillation circuit is input to CLKIN. When a clock with a frequency of, for example, 50 MHz is input to CLKIN, the PLL circuit 401 doubles the frequency of the input clock, and gives the doubled clock of 100 MHz to the counter circuit 402. The counter circuit 402 divides the clock of 100 MHz according to a value for CMODE[3:0], a value for CMODE_0[3:0], a value for CMODE_1[3:0], a value for CMODE_2[3:0], and a value for CMODE_3[3:0] and gives each frequency-divided clock to each of the component units. Frequency dividing means to reduce the frequency. Frequency dividing by 2 means dividing the frequency in ½, and frequency dividing by 4 means dividing the frequency into ¼.

Based on a value input to CMODE_0[3:0], the frequency of the clock supplied to the cache of the CPU #0 is determined and the frequency of the clock to the shared memory 103 in the case of the arbitration circuit 102 permitting the CPU #0 to access the shared memory 103 is also determined. Based on a value input to CMODE_1[3:0], the frequency of the clock supplied to the cache of the CPU #1 is determined and the frequency of the clock to the shared memory 103 in the case of the arbitration circuit 102 permitting the CPU #1 to access the shared memory 103 is also determined.

Based on a value input to CMODE_2[3:0], the frequency of the clock supplied to the cache of the CPU #2 is determined and the frequency of the clock to the shared memory 103 in the case of the arbitration circuit 102 permitting the CPU #2 to access the shared memory 103 is also determined. Based on a value input to CMODE_3[3:0], the frequency of the clock supplied to the cache of the CPU #3 is determined and the frequency of the clock to the shared memory 103 in the case of the arbitration circuit 102 permitting the CPU #3 to access the shared memory 103 is also determined.

A CPU permitted by the arbitration circuit 102 to access the shared memory 103 is determined based on SEL[1:0]. For example, if SEL[1:0] is "00", the CPU #0 is permitted to access the shared memory 103. If SEL[1:0] is "01", the CPU #1 is permitted to access the shared memory 103. For example, if SEL[1:0] is "10", the CPU #2 is permitted to access the shared memory 103. If SEL[1:0] is "11", the CPU #3 is permitted to access the shared memory 103.

Based on a value input to CMODE[3:0], the frequency of a clock supplied to each of the component units of the multi-core processor other than the caches of the CPUs and the shared memory 103 is determined.

With reference to FIG. 2, the clock table 133 and the clock control table 134 stored in the shared memory 103 will be described.

FIG. 5 is an explanatory diagram of one example of the clock table 133. The clock table 133 has a memory clock table 501 and another clock table 511. The memory clock table 501 is the table for determining the frequency of a memory clock, and has a CMODE_x[3:0] field 502 and a ratio field 503. "x" in CMODE_x denotes 0 to 3 that correspond to the CPU #0 to CPU #3. The value in the CMODE_x[3:0] field 502 corresponds to CMODE_x[3:0] of the frequency-dividing circuit 104. The ratio field 503 has a shared memory field 504 and a cache field 505, and a value in the ratio field 503 represents a frequency-dividing ratio for the frequency resulting from the multiplication by the PLL circuit 401.

As described above, frequency dividing means reducing the frequency. Frequency dividing by 2 means dividing a frequency in ½, and frequency dividing by 4 means dividing the frequency into ¼. If a value in the ratio field 503 is 2, it indicates frequency dividing by 2. If a value in the ratio field 503 is 4, it indicates frequency dividing by 4.

For example, when the value in the CMODE_x[3:0] field 502 is "0000", the value in the shared memory field 504 is 2, and the value in the cache field 505 is 2, this means that when the frequency resulting from the multiplication by the PLL circuit 401 is 100 MHz, the frequency of a clock to the shared memory 103 is 50 MHz and the frequency of clock to the cache is 50 MHz. When CMODE_x[3:0] input to the frequency-dividing circuit 104 is "0000", CMODE_x[3:0] is defined as a default memory clock. Therefore, the scheduler 121 setting a memory clock back to the default memory clock means setting CMODE_x[3:0] given to the frequency-dividing circuit 104 to "0000".

The other clock table 511 is a table for determining the clock to be supplied to each of the component units of the multi-core processor other than the shared memory 103 and cache, and has a CMODE[3:0] field 512 and a ratio field 513. The value in the CMODE[3:0] field 512 is the value given to CMODE[3:0] of the frequency-dividing circuit 104. The ratio field 513 has an external bus field 514, a core field 515, etc., which are fields for the component units of the multi-core processor system 100 other than the shared memory 103 and cache. The value in the ratio field 513 represents a ratio for the frequency that results from the multiplication by the PLL circuit 401.

FIG. 6 is an explanatory diagram of one example of the clock control table 134. The clock control table 134 is a table for determining the memory clock in the power-saving mode, based on the task assigned to each CPU, and has a task field 601 and a ratio field 602. The ratio field 602 has a shared memory field 603 and a cache field 604. In the clock control table 134, a value for the shared memory field 603 and a value for the cache field 604 are entered for each task name indicated in the task field 601.

A value for the shared memory field 603 and a value for the cache field 604 each represents a frequency-dividing ratio for a clock that results from the multiplication by the PLL circuit 401. For example, the table indicates that when the task #0 is not synchronized with another task and the OS running on the CPU to which the task #0 is assigned is in the power-saving mode, a frequency-divided clock yielded by dividing the frequency by 2, of a clock resulting from the multiplication by the PLL circuit 401 can be supplied to the shared memory 103 and can also be supplied to the cache memory of the CPU to which the task #0 is assigned.

In other words, when a given task is not synchronized with another task in the power-saving mode, the memory clock can be reduced. Reducing the memory clock means reducing the frequency of the memory clock.

A case is assumed where the task #0, which is in a completed state and not synchronized with another task, and the non-synchronous task #5 are assigned to the same CPU on which the OS is running in the power-saving mode. When the task name in the task field 601 is task #0, the value for the shared memory field 603 is 2. When the task name in the task field 601 is task #5, the value for the shared memory field 603 is 4. In such a case, the clock with the higher frequency is given priority. Hence, the clock to be supplied to the shared memory 103 is reduced into a clock obtained by dividing by 2, the frequency of the clock resulting from the multiplication by the PLL circuit 401.

As describe above, each OS makes a transition from the normal mode to the power-saving mode depending on the state of a task assigned to the CPU that executes the OS. For example, when the state of the task #0 changes from an operating state to a completed state ("complete"), OS running on the CPU to which the task #0 is assigned detects the change in the state, makes a transition to the power-saving mode, and sets POW in the register of the CPU to 1.

The reference of description returns to FIG. 2, in which an I/F (interface), a display, and a keyboard included the multi-core processor system 100 are not depicted. The I/F is connected to a network, such as local area network (LAN), a wide area network (WAN), and the Internet, through a communication line, and is connected to apparatuses via the network. The I/F interfaces the network and the component units of the multi-core processor system 100 and controls the input and output of data with respect to an external apparatus. For example, a modem, LAN adaptor, etc., may be adopted as the I/F.

The display displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display. The keyboard includes, for example, keys for inputting letters, numerals, and various instructions and performs the input of data. Alternatively, a touch-panel-type input pad or numeric keypad, etc. may be adopted.

The CPU #0 executes the tasks #0 and #1, the CPU #2 executes the tasks #2 and #3, and the CPU #3 executes the task #6.

Figure 7:
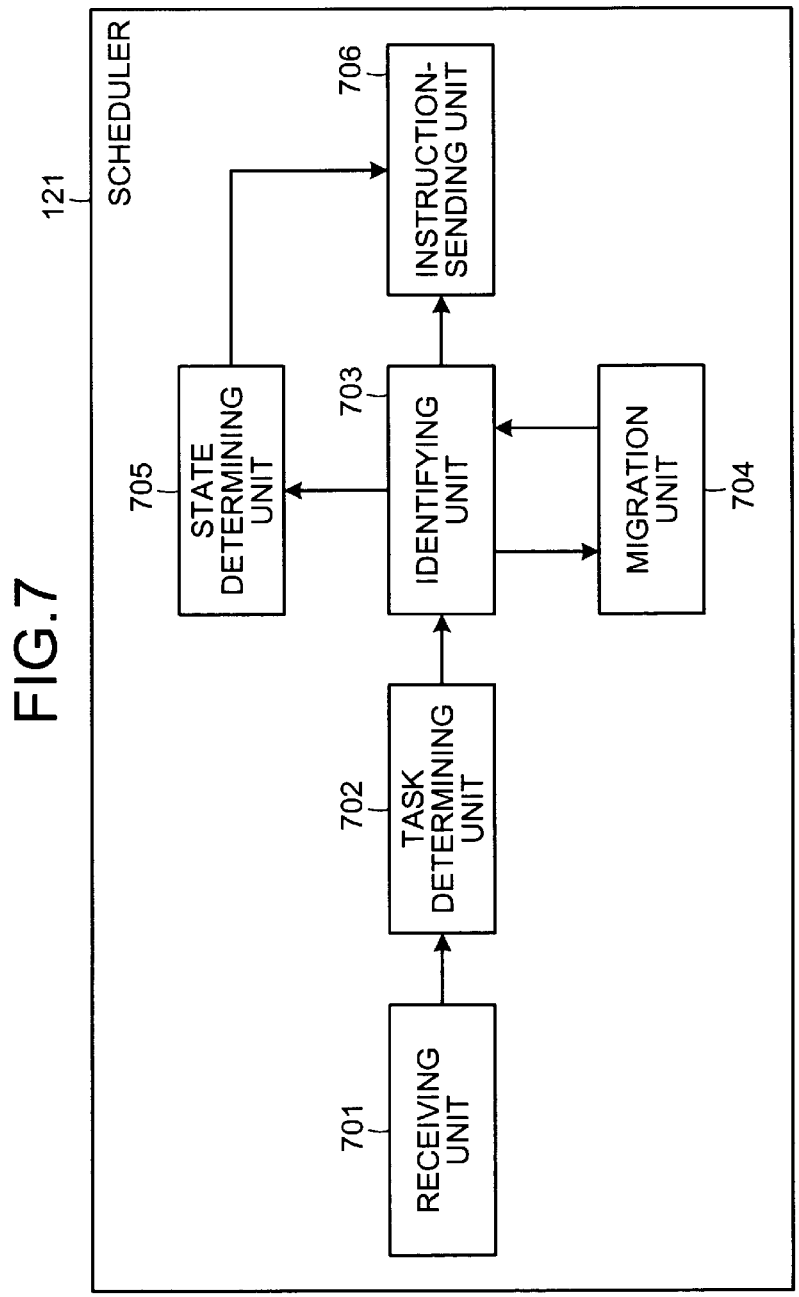
FIG. 7 is a block diagram of a functional configuration of a scheduler 121 according to the embodiment.

FIG. 7 is a block diagram of a functional configuration of the scheduler 121 according to the embodiment. The scheduler 121 includes a receiving unit 701, a task determining unit 702, an identifying unit 703, a migration unit 704, a state determining unit 705, and an instruction-sending unit 706. Each of these functions (receiving unit 701 to instruction-sending unit 706) is realized by, for example, causing the CPU #0 to execute the scheduler 121 stored in the shared memory 103.

In the embodiment, the functional units are described separately in a first example to a third example. The first example relates to an example in which a task-assigned CPU is identified based on whether a given thread is a synchronous task or non-synchronous task. The second example relates to an example in which a CPU to which a given thread is assigned is not identified. The third example relates to an example in which a memory clock is reduced when the OS running on the CPU to which a synchronous task is assigned makes a transition to the power-saving mode.

First Example

The receiving unit 701 receives an instruction to assign a given task. When the receiving unit 701 receives the instruction to assign a given task, the task determining unit 702 determines whether a task to be synchronized with the given task is present.

If the task determining unit determines that a task to be synchronized with the given task is present, the identifying unit 703 identifies among the CPUs making up the multi-core processor, a CPU to which no non-synchronous task that is not synchronized with another task has been assigned. If the task determining unit determines that a task to be synchronized with the given task is not present, the identifying unit 703 identifies among the CPUs making up the multi-core processor, a CPU to which a synchronous task that is synchronized with another task is not assigned.

Subsequently, the instruction-sending unit 706 sends to the CPU identified by the identifying unit 703, an instruction to start the given task. In addition to the above description, further description will be made in detail referring to the drawings.

Figure 8:
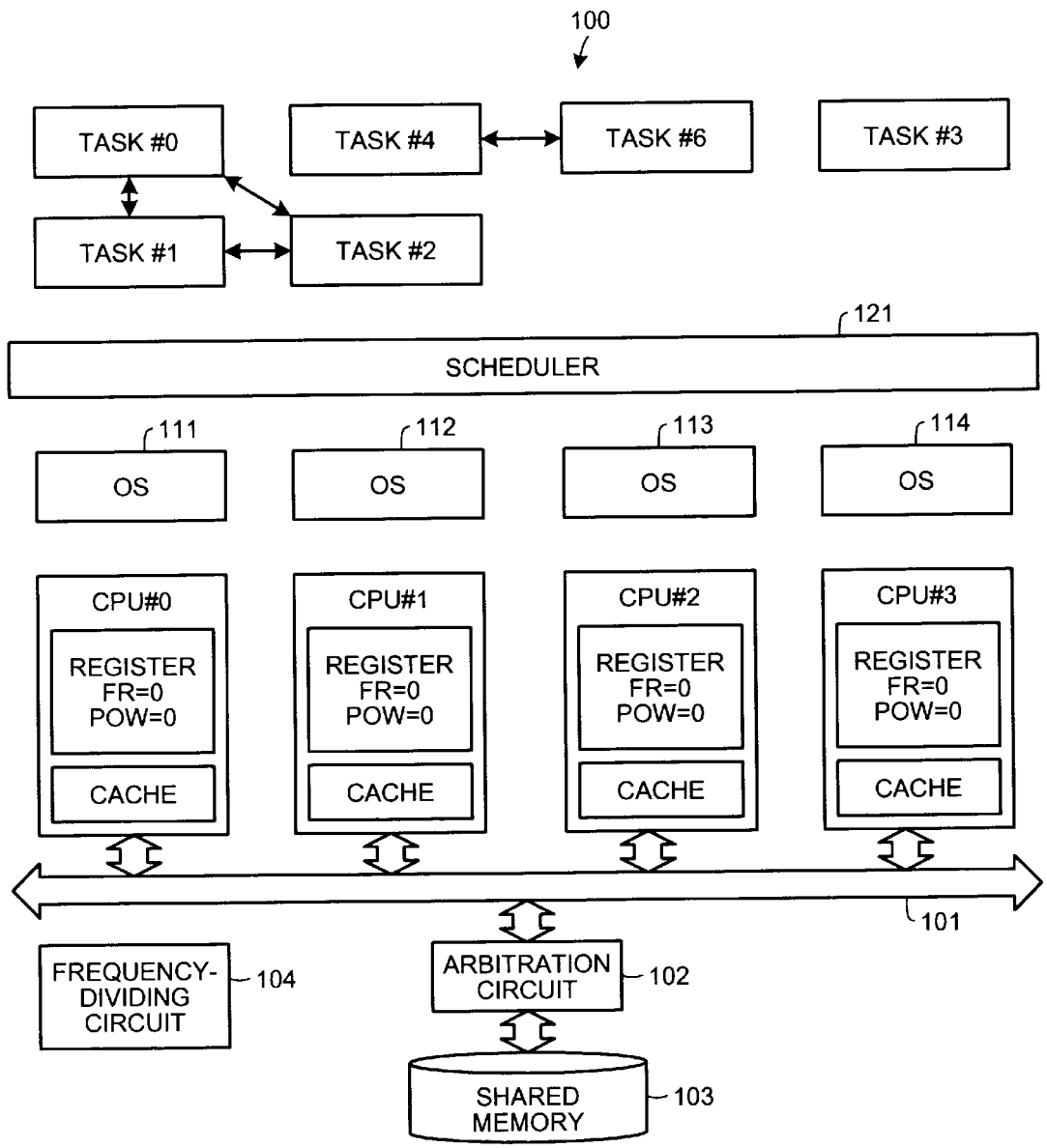
FIG. 8 is an explanatory diagram of an example in which each task is assigned to CPUs in a first example.

FIG. 8 is an explanatory diagram of an example in which each task is assigned to the CPUs in the first example. The tasks #0 and #1 are assigned to the CPU #0, and the tasks #2 and #4 are assigned to the CPU #1. The task #6 is assigned to the CPU #2, and the task #3 is assigned to the CPU #3. The tasks #0, #1, and #2 are to be synchronized with each other, the tasks #4 and #6 are to be synchronized with each other, and the task #3 is a non-synchronous task.

Figure 9:
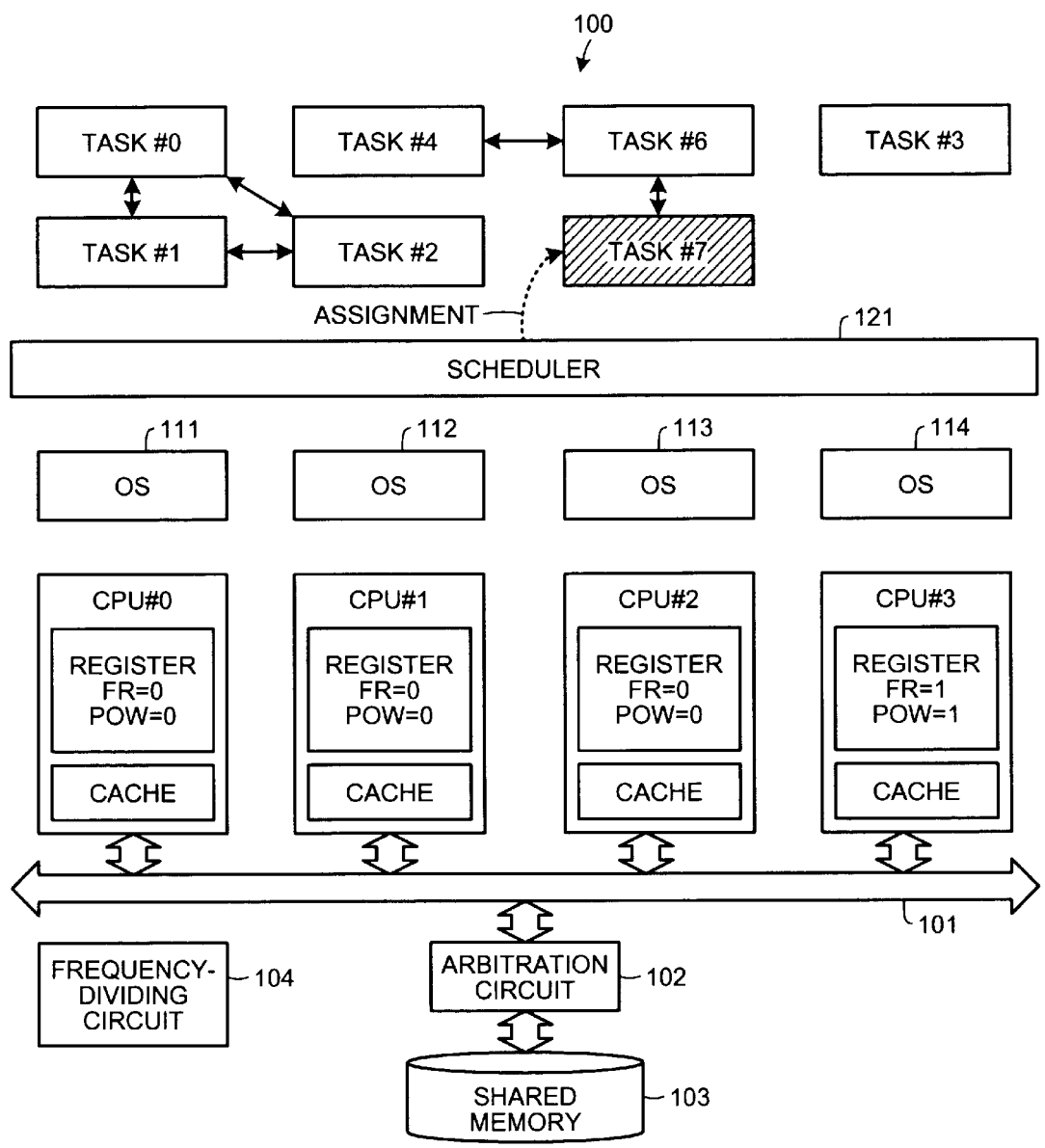
FIG. 9 is an explanatory diagram of an example of assignment of a task #7 as a non-synchronous task in the first example.

FIG. 9 is an explanatory diagram of an example of assignment of the task #7 as a non-synchronous task in the first example. When the scheduler 121 receives an instruction to assign the task #7, the scheduler 121 reads the synchronization table 132, searches the task field 301 of the synchronization table 132 for the task #7, and reads the task name in the corresponding synchronized task field 302. Thus, the scheduler 121 determines whether the task #7 is a synchronous task or non-synchronous task based on whether a task name is entered in the synchronized task field 302 corresponding to the task field 301 in which the task #7 is indicated.

When the task name in the task field 301 is task #7, the task name entered in the synchronized task field 302 is task #6 and therefore, the scheduler 121 determines the task #7 to be a synchronous task. The scheduler 121 identifies a CPU to which no non-synchronous task has been assigned among the CPUs #0 to #3. In this example, the CPUs #1 and #2 are identified as CPUs to which no non-synchronous task has been assigned.

The scheduler 121 identifies the CPU having the lowest load among the CPUs #1 and #2, and sends an instruction for the start of the task #7 to the identified CPU. In this example, the instruction for the start of the task #7 is sent to the CPU #2.

Figure 10:
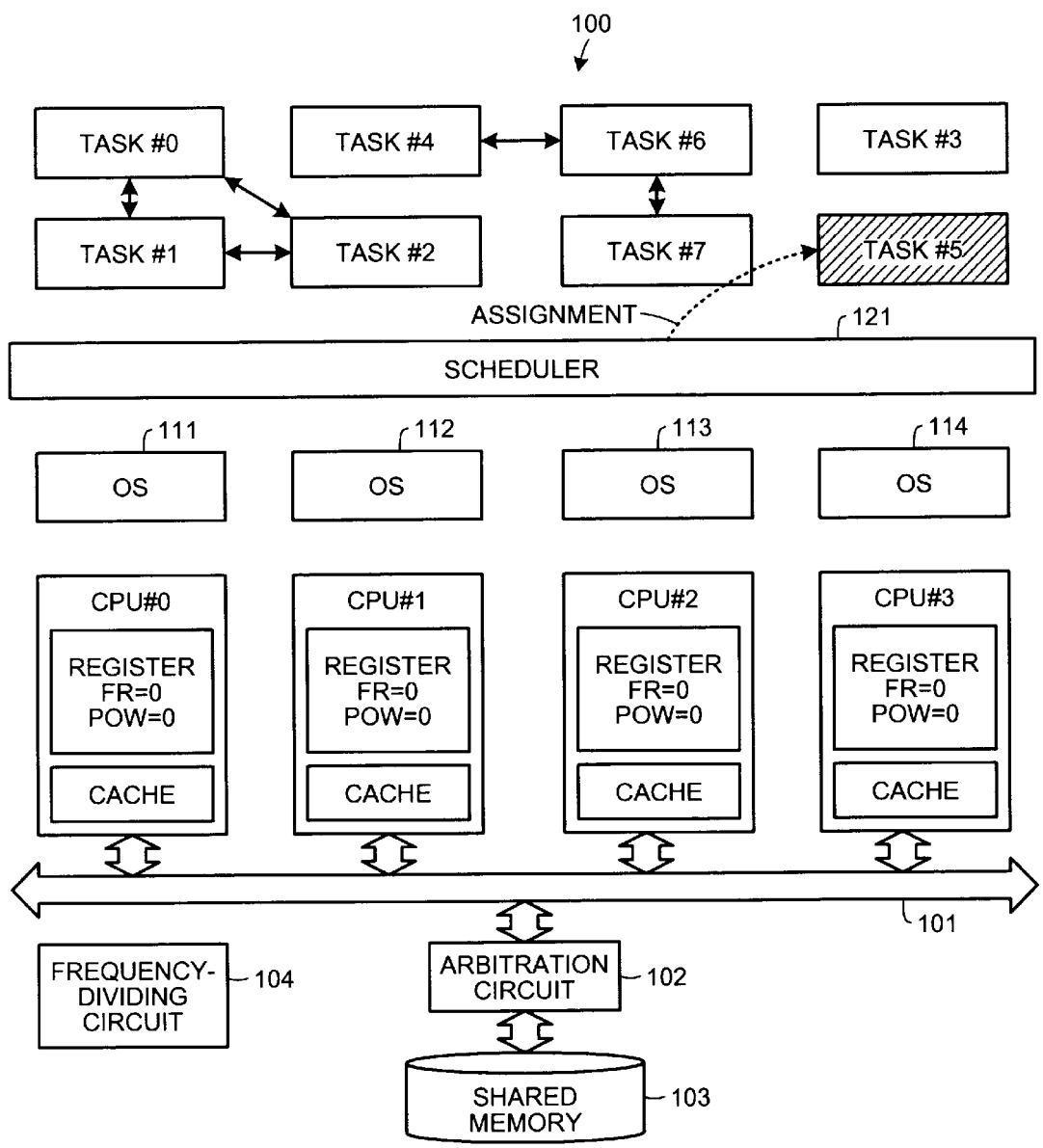
FIG. 10 is an explanatory diagram of an example of assignment of a task #5 as a non-synchronous task in the first example.

FIG. 10 is an explanatory diagram of an example of assignment of the task #5 as a non-synchronous task in the first example. When the scheduler 121 receives an instruction to assign the task #5, the scheduler 121 reads the synchronization table 132, searches the task field 301 of the synchronization table 132 for the task #5, and reads the task name in the corresponding synchronized task field 302. Thus, the scheduler 121 determines whether the task #5 is a synchronous task or non-synchronous task based on whether a task name is entered in the synchronized task field 302 corresponding to the task field 301 in which the task #5 is indicated.

When the task name in the task field 301 is task #5, no task name is entered in the synchronized task field 302 and therefore, the scheduler 121 determines the task #5 to be a non-synchronous task. The scheduler 121 identifies a CPU to which no synchronous task has been assigned among the CPUs #0 to #3. In this example, the CPU #3 is identified as a CPU to which no synchronous task has been assigned. The scheduler 121 thus sends an instruction for the start of the task #5 to the CPU #3.

Figure 11:
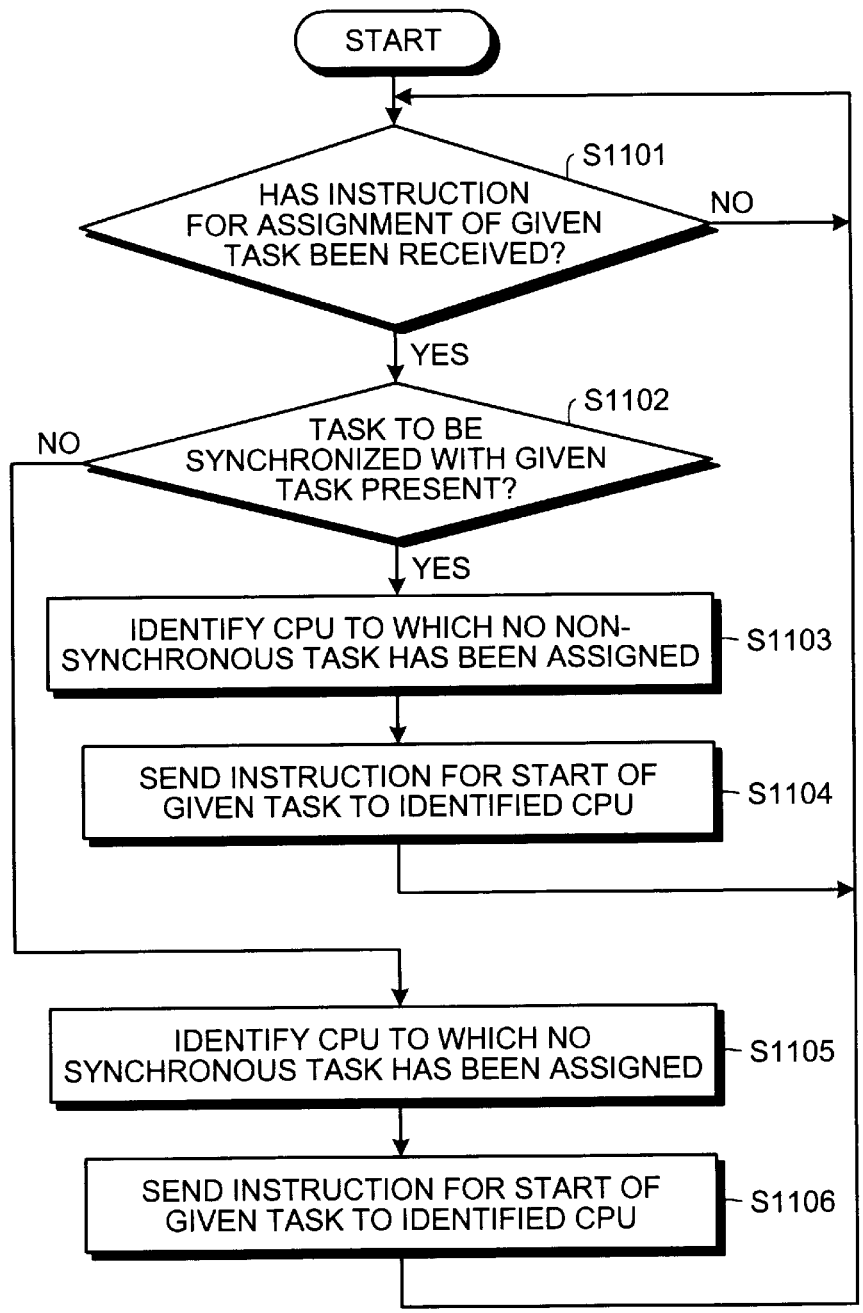
FIG. 11 is a flowchart of a control procedure by the scheduler 121 according to the first example.

FIG. 11 is a flowchart of a control procedure by the scheduler 121 according to the first example. The scheduler 121 determines whether an instruction for the assignment of a given task has been received (step S1101). Upon determining that an instruction for the assignment of a given task has not been received (step S1101: NO), the scheduler 121 returns to step S1101.

Upon determining that an instruction for the assignment of a given task has been received via the receiving unit 701 (step S1101: YES), the scheduler 121, via the task determining unit, determines whether a task to be synchronized with the given task is present (step S1102). Upon determining that a task to be synchronized with the given task is present (step S1102: YES), the scheduler 121, via the identifying unit 703, identifies a CPU to which no non-synchronous task has been assigned (step S1103). The scheduler 121 then sends, via the instruction-sending unit 706, an instruction for the start of the given task to the identified CPU (step S1104), and returns to step S1101.

Upon determining that a task to be synchronized with the given task is not present (step S1102: NO), the scheduler 121, via the identifying unit 703, identifies a CPU to which no synchronous task has been assigned (step S1105). The scheduler 121 then sends, via the instruction-sending unit 706, an instruction for the start of the given task to the identified CPU (step S1106), and returns to step S1101.

Second Example

The second example relates to a case where a CPU to which no non-synchronous task has been assigned is not identified when a task to be synchronized with a given thread is present and to a case where a CPU to which no synchronous task has been assigned is not identified when a task to be synchronized with the given thread is not present.

FIG. 7 is referred to again. When it is determined that a task to be synchronized with a given task is present, if a CPU to which no non-synchronous task has been assigned is not identified, the identifying unit 703 identifies among the CPUs making up the multi-core processor, a group of CPUs to which non-synchronous tasks are assigned.

The migration unit 704 causes a non-synchronous task assigned to a CPU among the group of CPUs identified by the identifying unit 703 to migrate to another CPU among the CPU group.

After the migration unit 704 causes the non-synchronous task assigned to a given CPU to migrate to another CPU, the instruction-sending unit 706 sends an instruction for the start of the given task to the given CPU.

When it is determined that a task to be synchronized with the given task is not present, if a CPU to which no synchronous task has been assigned is not identified, the identifying unit 703 identifies among the CPUs making up the multi-core processor, a group of CPUs to which synchronous tasks have been assigned.

The migration unit 704 causes a synchronous task assigned to a given CPU among the group of CPUs identified by the identifying unit 703 to migrate to another CPU among the CPU group.

After the migration unit 704 causes the synchronous task assigned to the given CPU to migrate to another CPU, the instruction-sending unit 706 sends an instruction for the start of the given task to the given CPU.

In addition to the above description, further description will be made in detail referring to the drawings.

Figure 12:
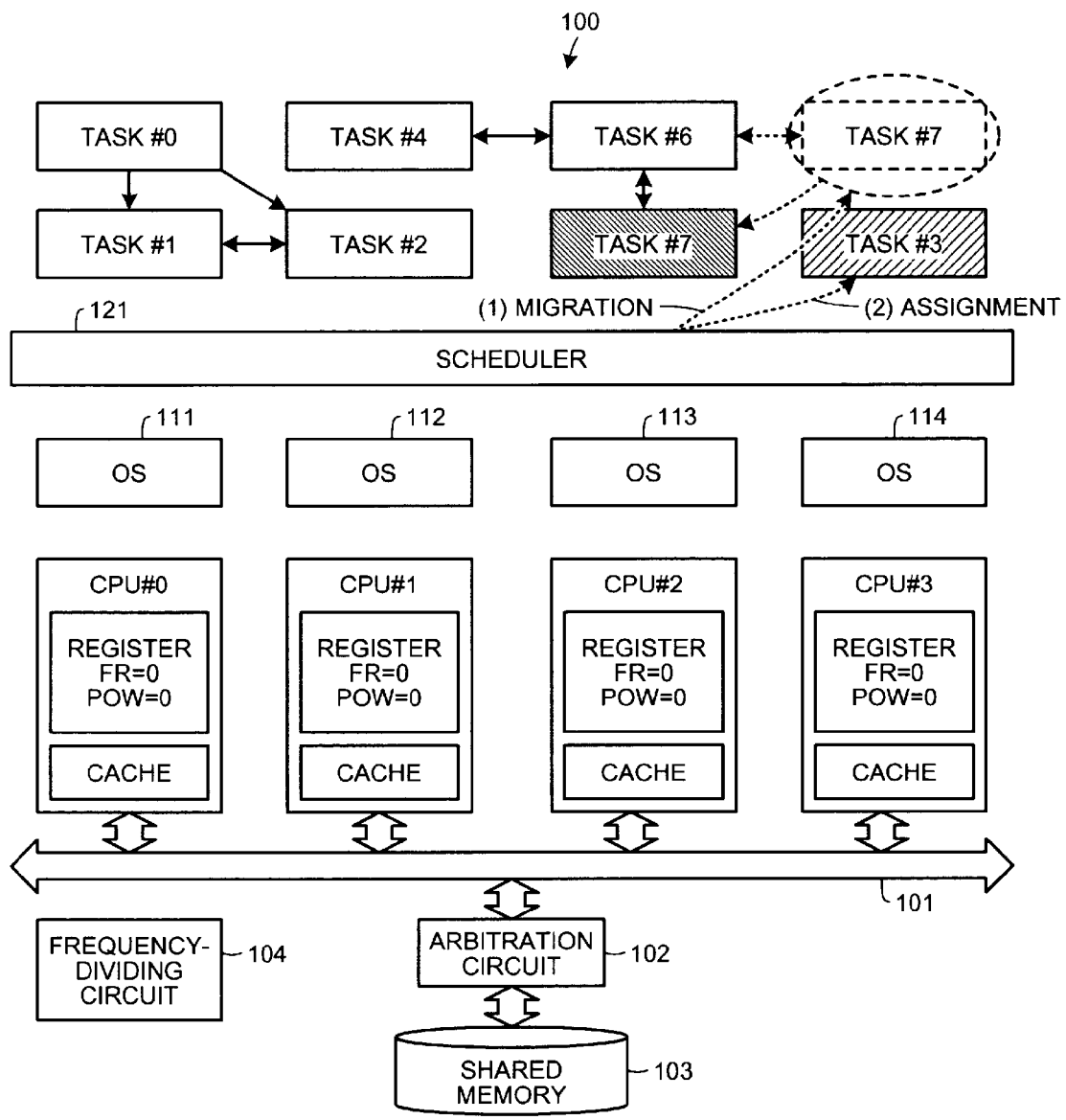
FIG. 12 is an explanatory diagram of an example of assignment of a task #3 as a non-synchronous task in a second example.

FIG. 12 is an explanatory diagram of an example of assignment of the task #3 as a non-synchronous task in the second example. In FIG. 12, the task #0 and the task #1 are assigned to the CPU #0, the task #2 and the task #4 are assigned to the CPU #1, the task #6 is assigned to the CPU #2, and the task #7 (indicated by a dotted line) is assigned to the CPU #3.

Upon receiving an instruction for the assignment of the task #3, the scheduler 121 determines whether the task #3 is a synchronous task or non-synchronous task. Since the task #3 is a non-synchronous task, the scheduler 121 attempts to identify among the CPUs #0 to #3, a CPU to which no synchronous task has been assigned.

A CPU to which no synchronous task has been assigned is not present. Unable to identify a CPU to which no synchronous task has been assigned, the scheduler 121 identifies a group of CPUs to which synchronous tasks have been assigned. In this example, the CPUs #0 to #3 are identified as a group of CPUs to which synchronous tasks have been assigned.

The scheduler 121 then identifies a first low-load CPU having the lowest load among the group of CPUs to which synchronous tasks have been assigned and also identifies a second low-load CPU having the second lowest load among the group of CPUs. In FIG. 12, the CPU #3 is identified as the first low-load CPU and the CPU #2 is identified as the second low-load CPU.

The scheduler 121 (1) causes the task #7 assigned to the CPU #3, which is the first low-load CPU, to migrate to the CPU #2, which is the second low-load CPU. After migration of the task #7 is over, (2) the scheduler 121 sends an instruction for the start of the task #3 to the CPU #3 to which no task has been assigned.

Figure 13:
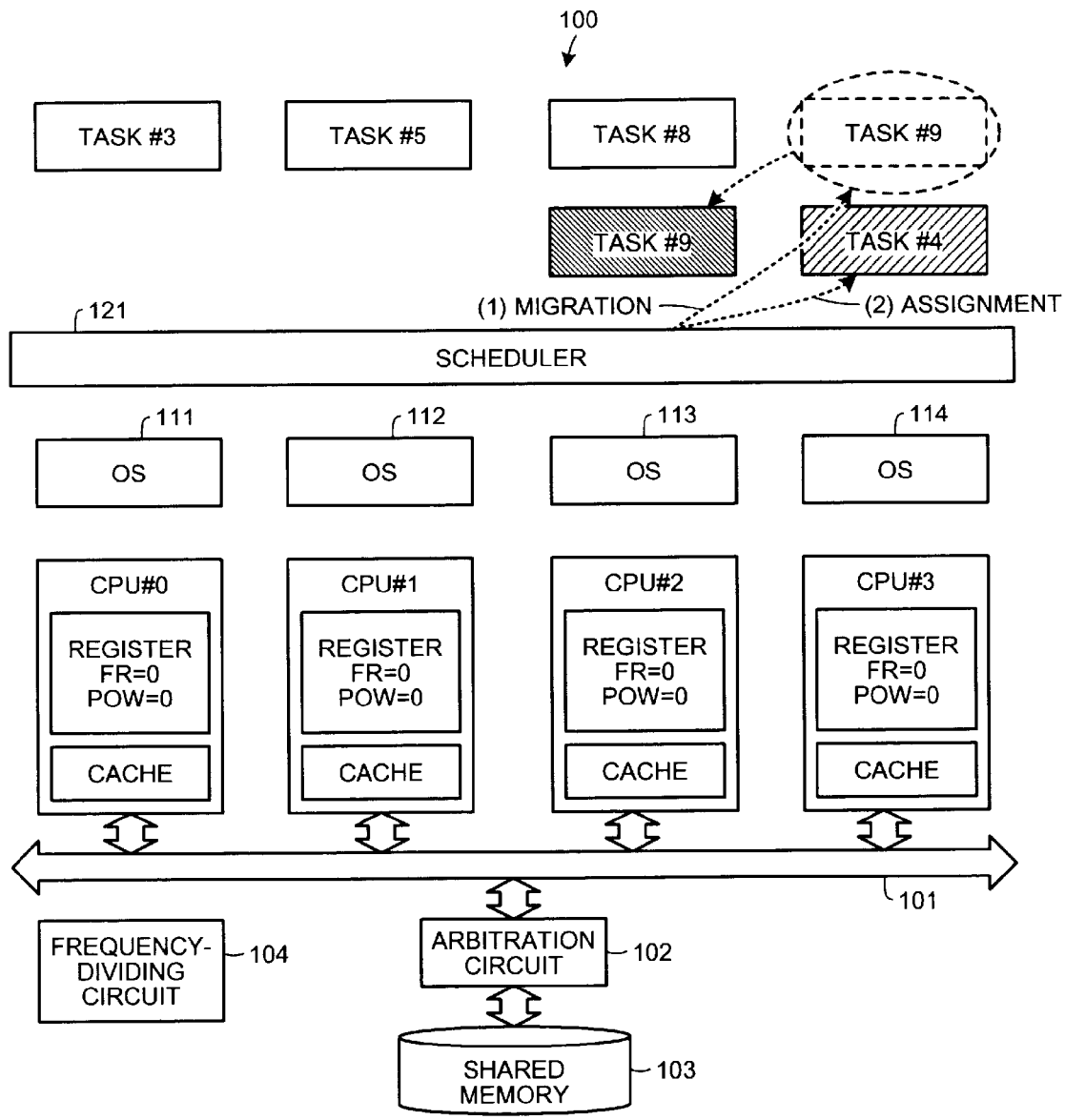
FIG. 13 is an explanatory diagram of an example of assignment of a task #4 as a synchronous task in the second example.

FIG. 13 is an explanatory diagram of an example of assignment of the task #4 as a synchronous task in the second example. In FIG. 13, the task #3 is assigned to the CPU #0, the task #5 is assigned to the CPU #1, the task #8 is assigned to the CPU #2, and the task #9 (indicated by a dotted line as the task #9 before migration) is assigned to the CPU #3. The tasks #3, #5, #8, and #9 are non-synchronous tasks.

Upon receiving an instruction for the assignment of the task #4, the scheduler 121 determines whether the task #4 is a synchronous task or non-synchronous task. Since the task #4 is a synchronous task, the scheduler 121 attempts to identify among the CPUs #0 to #3, a CPU to which no non-synchronous task has been assigned.

A CPU to which no non-synchronous task has been assigned is not present. Unable to identify a CPU to which no non-synchronous task has been assigned, the scheduler 121 identifies a group of CPUs to which non-synchronous tasks have been assigned. In this example, the CPUs #0 to #3 are identified as a group of CPUs to which non-synchronous tasks have been assigned.

The scheduler 121 identifies a first low-load CPU having the lowest load among the group of CPUs to which non-synchronous tasks are assigned and also identifies a second low-load CPU having the second lowest load among the group of CPUs. In FIG. 13, the CPU #3 is identified as the first low-load CPU and the CPU #2 is identified as the second low-load CPU.

The scheduler 121 (1) causes the task #9 assigned to the CPU #3, which is the first low-load CPU, to migrate to the CPU #2, which is the second low-load CPU. After migration of the task #9 is over, (2) the scheduler 121 sends an instruction for the start of the task #4 to the CPU #3 to which no task has been assigned.

Third Working Example

The third example relates to an example in which the OS is in the power-saving mode and the memory clock to a CPU to which only a non-synchronous task(s) is assigned, is reduced. Conventionally, power consumption by the shared memory 103 accounts for a large percentage of the overall power consumption by the multi-core processor system 100. Because access to the shared memory 103 and cache cannot be delayed in the execution of a synchronous task requiring synchronous processing, the frequency of the clock supplied to the shared memory 103 and cache cannot be reduced. In a conventional case, a synchronous task and a non-synchronous task are usually assigned together to a CPU, which constantly poses a problem in that the frequency of the clock supplied to the shared memory 103 and cache cannot be reduced.

The scheduler 121 of the present invention carries out control to prevent simultaneous assignment of a synchronous task and a non-synchronous task to the same CPU. The third example relates to an example in which the OS is in the power-saving mode and the frequency of the clock supplied to the cache of a CPU to which only a non-synchronous task(s) is assigned and the frequency of the clock supplied to the shared memory 103 are reduced in a period during which the arbitration circuit 102 permits the CPU to access the shared memory 103.

The third example relates to an example in which a non-synchronous task assigned to a CPU receiving a reduced clock is assigned to a different CPU through a migration process and a synchronous task is assigned to the CPU receiving the reduced clock.

FIG. 7 is referred to again. When it is determined that a task to be synchronized with a given task is not present, the state determining unit 705 determines whether a CPU identified by the identifying unit 703 is in the power-saving mode.

When the state determining unit 705 determines that the identified CPU is in the power saving mode, the instruction-sending unit 706 sends to the frequency-dividing circuit 104, an instruction to reduce to a given frequency, the frequency of the clock supplied to the shared memory 103 and the frequency of the clock supplied to the cache of the CPU.

In addition to the above description, further description will be made in detail referring to the drawings.

Figure 14:
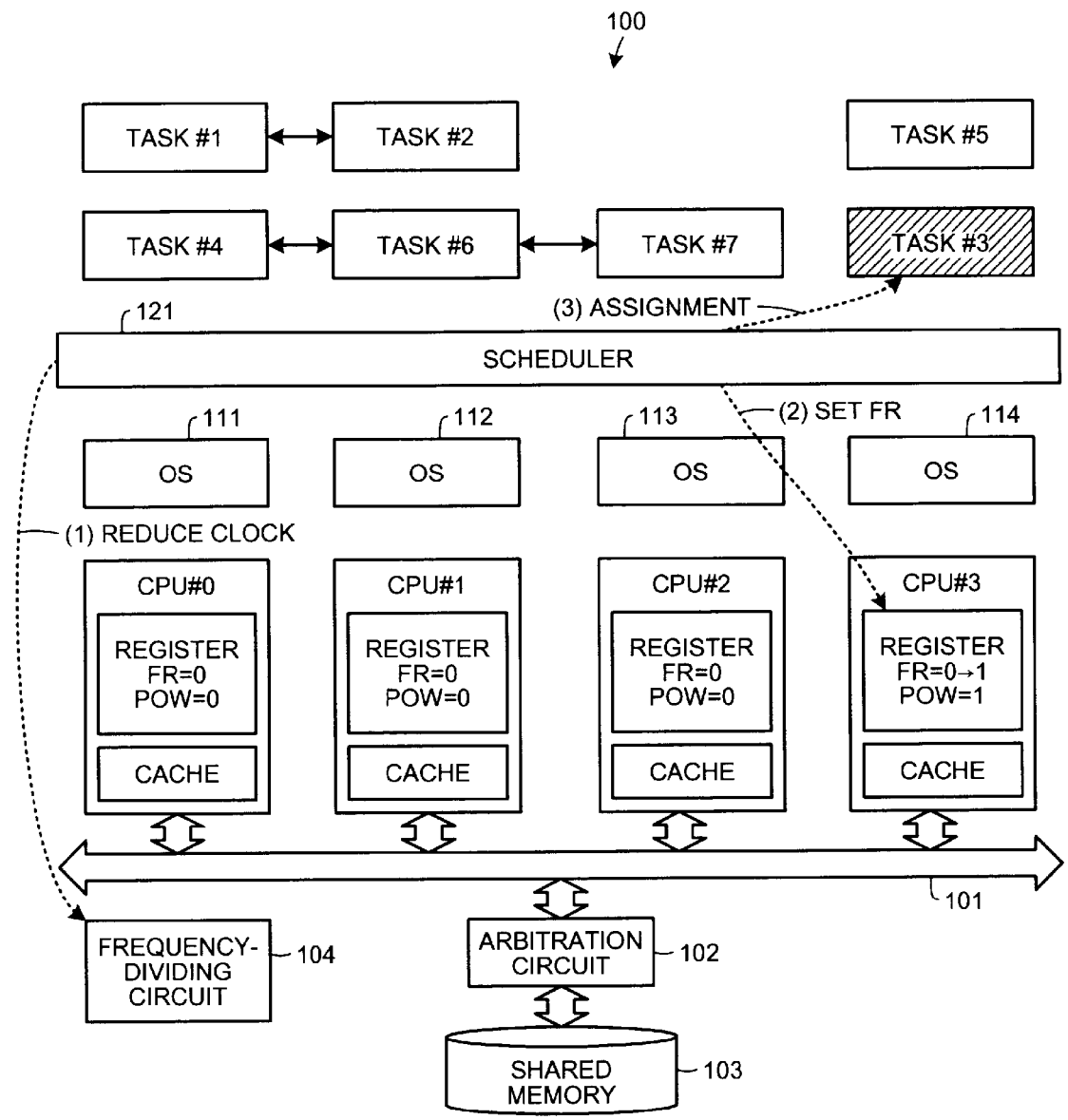
FIG. 14 is an explanatory diagram of an example of reducing a memory clock in a third example.

FIG. 14 is an explanatory diagram of an example of reducing the memory clock in the third example. In FIG. 14, the task #1 and the task #4 are assigned to the CPU #0, the task #2 and the task #6 are assigned to the CPU #1, the task #7 is assigned to the CPU #2, and the task #5 is assigned to the CPU #3.

Upon receiving an instruction for the assignment of the task #3, the scheduler 121 determines whether the task #3 is a synchronous task or non-synchronous task. Since the task #3 is a non-synchronous task, the scheduler 121 attempts to identify among the CPUs #0 to #3, a CPU to which no synchronous task has been assigned.

The CPU #3 is identified as a CPU to which no synchronous task has been assigned. The scheduler 121 determines whether the OS 114 is in the power-saving mode, i.e., determines whether POW in the register of the CPU #3 is 1. POW=1 indicates that the OS 114 is in the power-saving mode, while POW=0 indicates that the OS 114 is not in the power-saving mode. In FIG. 14, POW in the register of the CPU #3 is 1 and only the non-synchronous task is assigned to the CPU #3. Hence, the scheduler 121 (1) reduces the memory clock to the CPU #3.

Reducing the memory clock to the CPU #3 means reducing the frequency of the clock to the cache of the CPU #3 and the frequency of the clock to the shared memory 103 when the arbitration circuit 102 permits the CPU #3 access to the shared memory 103. For example, the scheduler 121 sets CMODE_3[3:0] to "0000" and gives CMODE_3[3:0] "0000" to the frequency-dividing circuit 104.

The scheduler 121 then searches the clock control table 134 to find values for the shared memory field 603 and values for the cache field 604 for cases of a task name in the task field 601 being task #3 and a task name in the task field 601 being task #5. In the clock control table 134, when the task name in the task field 601 is task #5, the value for the shared memory field 603 is 4 and the value for the cache field 604 is 4. When the task name in the task field 601 is task #3, the value for the shared memory field 603 is 4 and the value for the cache field 604 is 4.

Thus, the values for the shared memory field 603 are the same and values for the cache memory field are also the same for both cases when the task name in the task field 601 is task #3 and the task name in the task field 601 is task #5. Hence, the scheduler 121 divides, by 4, the frequency of the clock resulting from the multiplication by the PLL circuit 401, thereby creating a frequency-divided clock to be supplied to the shared memory 103 and further divides, by 4, the frequency of the clock resulting from the multiplication by the PLL circuit 401, thereby creating a frequency-divided clock to be supplied to the cache.

The scheduler 121 refers to the memory clock table 501 and identifies the value for CMODE_x[3:0] that corresponds to the value for the shared memory field 504 to be 4 and the value for the cache field 505 to be 4. In this example, the memory clock table 501 indicates that when CMODE_x[3:0] is "0011", the shared memory field 504 is 4 and the cache field 505 is 4.

The scheduler 121, therefore, sets the value for CMODE_3[3:0] to "0011", gives CMODE_3[3:0] "0011" to the frequency-dividing circuit 104 and thereby, reduces the frequency of the clock supplied to the shared memory 103 and the frequency of the clock supplied to the cache of the CPU #3. As a result, a clock with a frequency of 25 MHz is supplied to the cache of the CPU #3, and a clock with a frequency of 25 MHz is supplied to the shared memory 103 in a period during which the arbitration circuit 102 permits the CPU #3 to access the shared memory 103.

(1) After reducing the memory clock, (2) the scheduler 121 sets FR in the register of the CPU #3 to 1, and (3) sends an instruction for the start of the task #3 to the CPU #3 and thereby, assigns the task #3 to the CPU #3.

Figure 15:
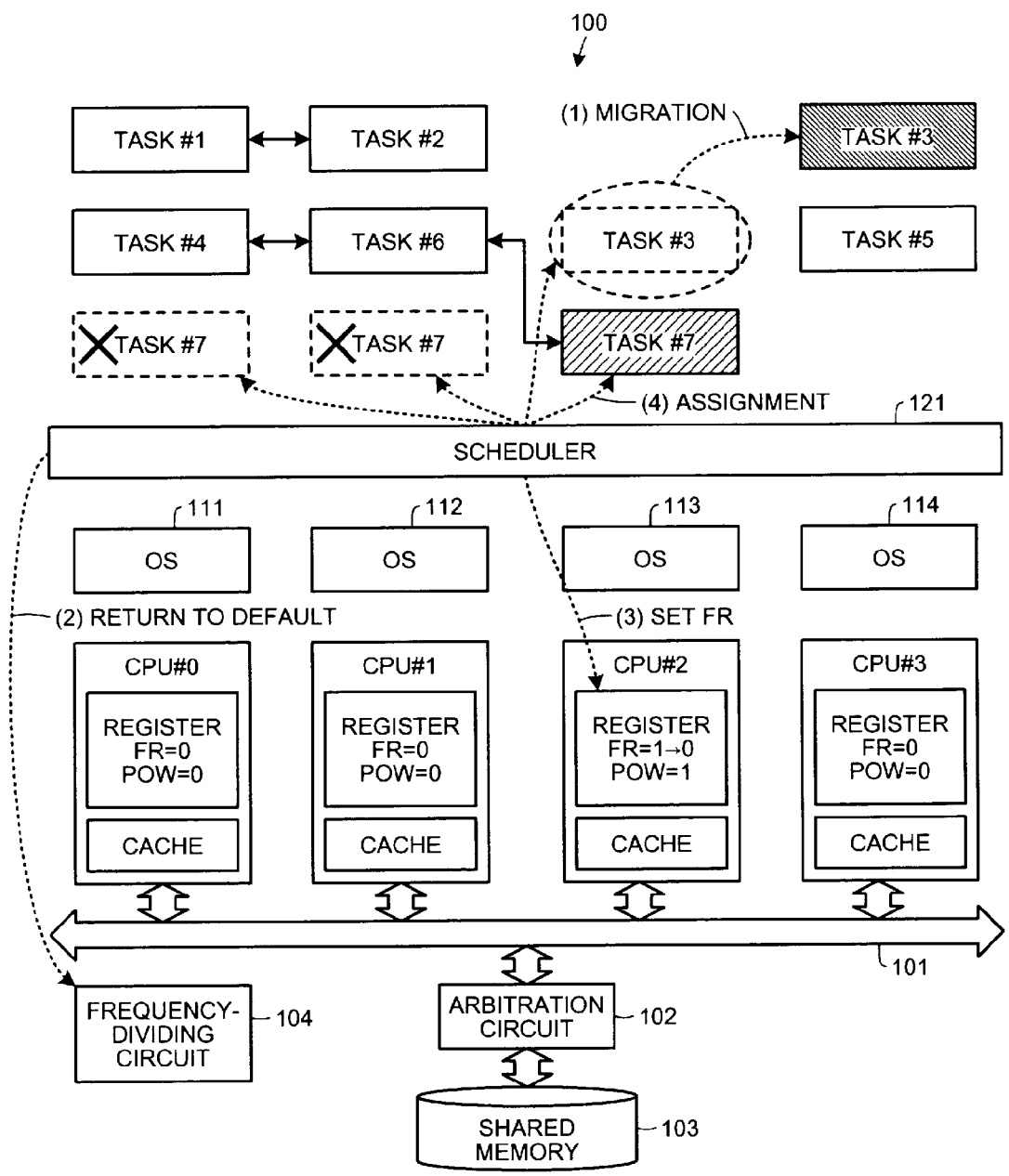
FIG. 15 is an explanatory diagram of an example of assignment of the task #7 as a synchronous task to a CPU in the third example.

FIG. 15 is an explanatory diagram of an example of assignment of the task #7 as a synchronous task to a CPU in the third example. In FIG. 15, the tasks #1 and #4 are assigned to the CPU #0, the tasks #2 and #6 are assigned to the CPU #1, the task #3 (indicated by a dotted line as the task #3 before migration) is assigned to the CPU #2, and the task #5 is assigned to the CPU #3.

Upon receiving an instruction for the assignment of the task #7, the scheduler 121 determines whether the task #7 is a synchronous task or non-synchronous task. Since the task #7 is a synchronous task, the scheduler 121 attempts to identify among the CPUs #0 to #3, a CPU to which no non-synchronous task has been assigned. In this example, the CPUs #0 and #1 are identified as CPUs to which no non-synchronous task has been assigned.

The scheduler 121 determines whether a real-time condition can be satisfied when the task #7 is assigned to the CPU #0. The real-time condition is, for example, a condition on an execution time, requiring the execution of a task within a certain time period. The scheduler 121 estimates the execution time for the task #7 and thereby, determines whether the real-time condition can be satisfied. In FIG. 15, the scheduler 121 determines that the real-time condition cannot be satisfied when the task #7 is assigned to the CPU #0.

The scheduler 121 then determines whether the real-time condition can be satisfied when the task #7 is assigned to the CPU #1. In FIG. 15, the scheduler 121 determines that the real-time condition cannot be satisfied when the task #7 is assigned to the CPU #1.

Upon being unable to assign a task to a CPU to which no non-synchronizing task is assigned, the scheduler 121 determines that a CPU to which non-synchronizing task is assigned cannot be identified. Upon failing to identify a CPU to which no non-synchronizing task is assigned, the scheduler 121 identifies a group of CPUs to which non-synchronous tasks have been assigned, as described in the second example. In this example, the scheduler 121 identifies the CPUs #2 and #3 as a group of CPUs to which non-synchronous tasks have been assigned.

The scheduler 121 then (1) causes a non-synchronous task assigned to the CPU #2 to migrate to the CPU #3, and determines whether the memory clock to the CPU #2 has been reduced, based on FR in the register of the CPU #2. Finding FR to be 1, the scheduler 121 determines that the memory clock to the CPU #2 has been reduced, and (2) sets the memory clock to the CPU #2 back to the default clock.

Having set the memory clock to the CPU #2 back to the default clock, the scheduler 121 (3) sets FR in the register of the CPU #2 to 0, and (4) sends an instruction for the start of the task #7 to the CPU #2 and thereby assigns the task #7 to the CPU #2.

In the examples of FIGS. 8 to 15, the assigning process that the scheduler 121 carries out when receiving an instruction to assign a task is described. The assigning process by the scheduler 121, however, is not limited to these examples. For example, when the state of a task changes from the normal state to the sleep state, the task as a synchronous task may change into a non-synchronous task. In such a case, the scheduler 121 reassigns the task so that a synchronous task and a non-synchronous task are not assigned to the same core.

Figure 16:
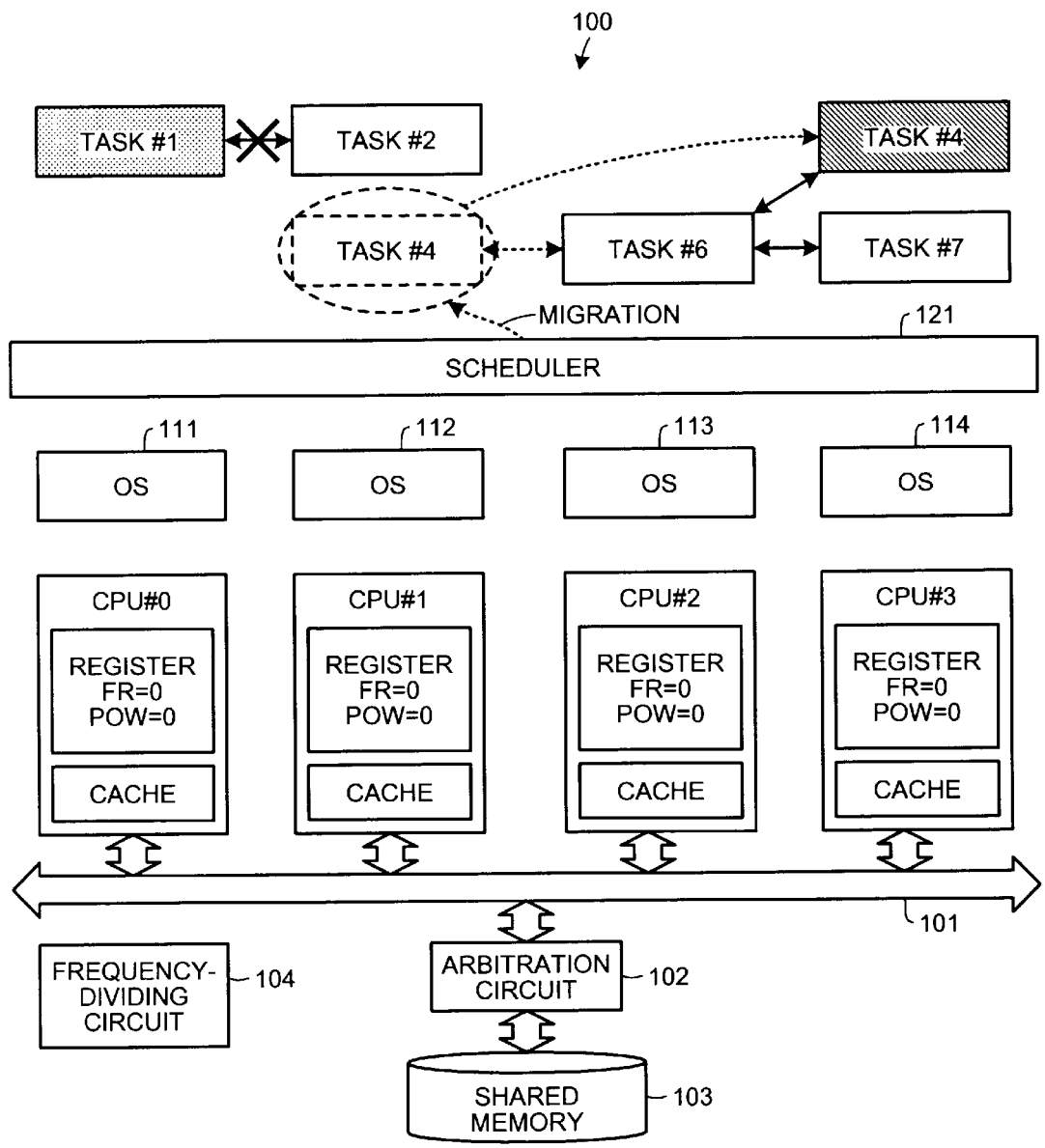
FIG. 16 is an explanatory diagram of an example in which the state of a task #1 changes from an operating state to a sleep state.
Figure 17:
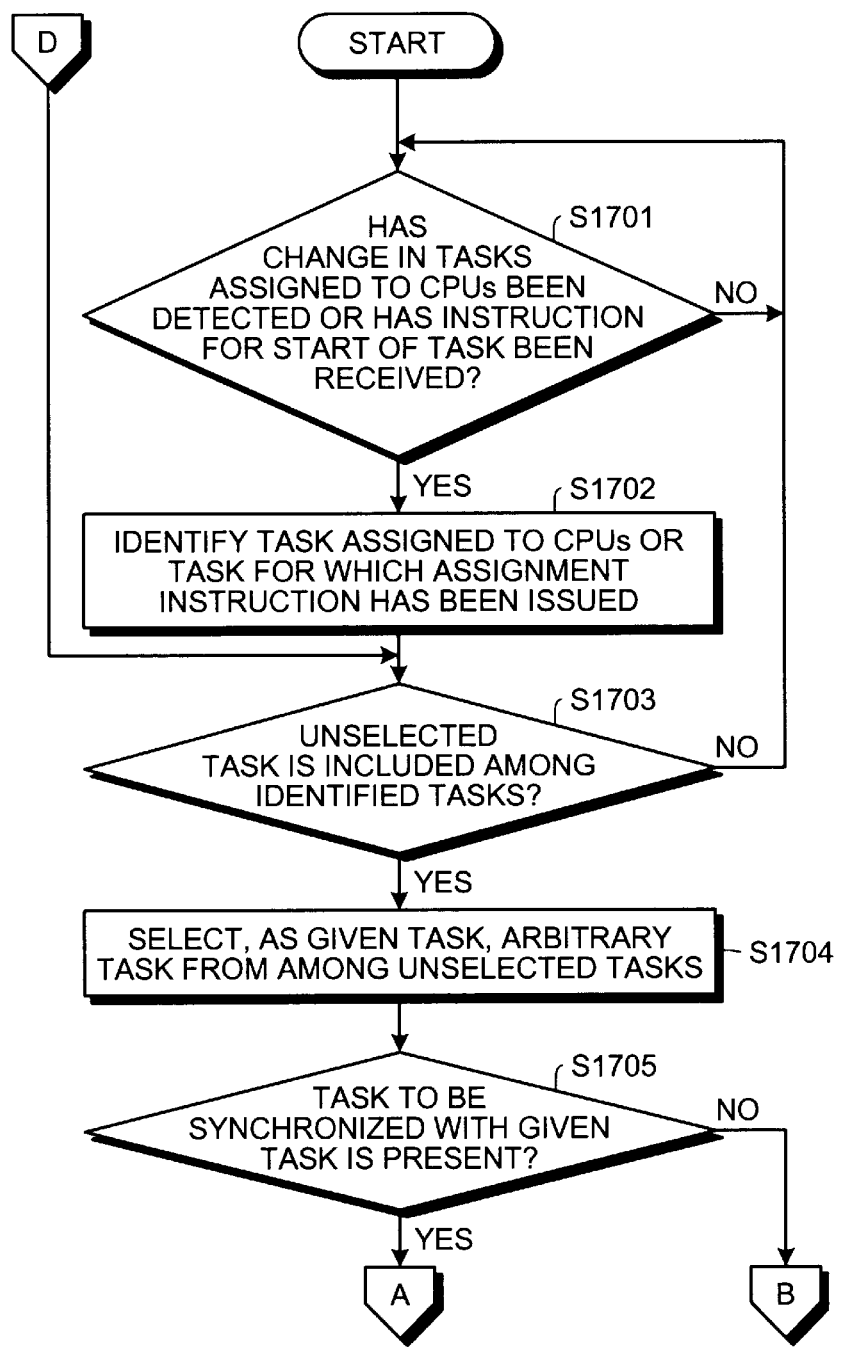
FIG. 17 is a first flowchart of an example of the control procedure by the scheduler 121 according to the second and third examples.
Figure 18:
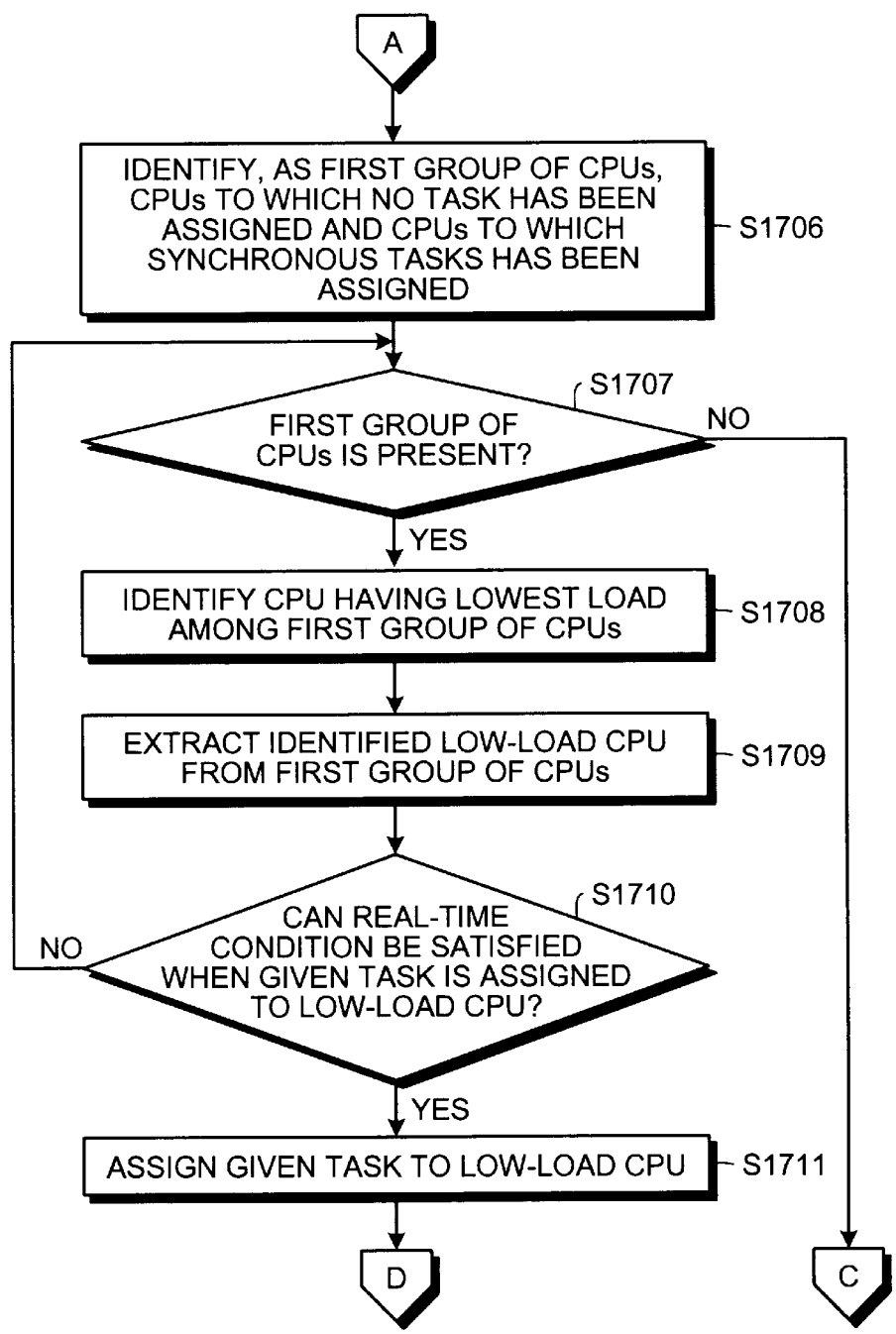
FIG. 18 is a second flowchart of the example of the control procedure by the scheduler 121 according to the second and third examples.
Figure 19:
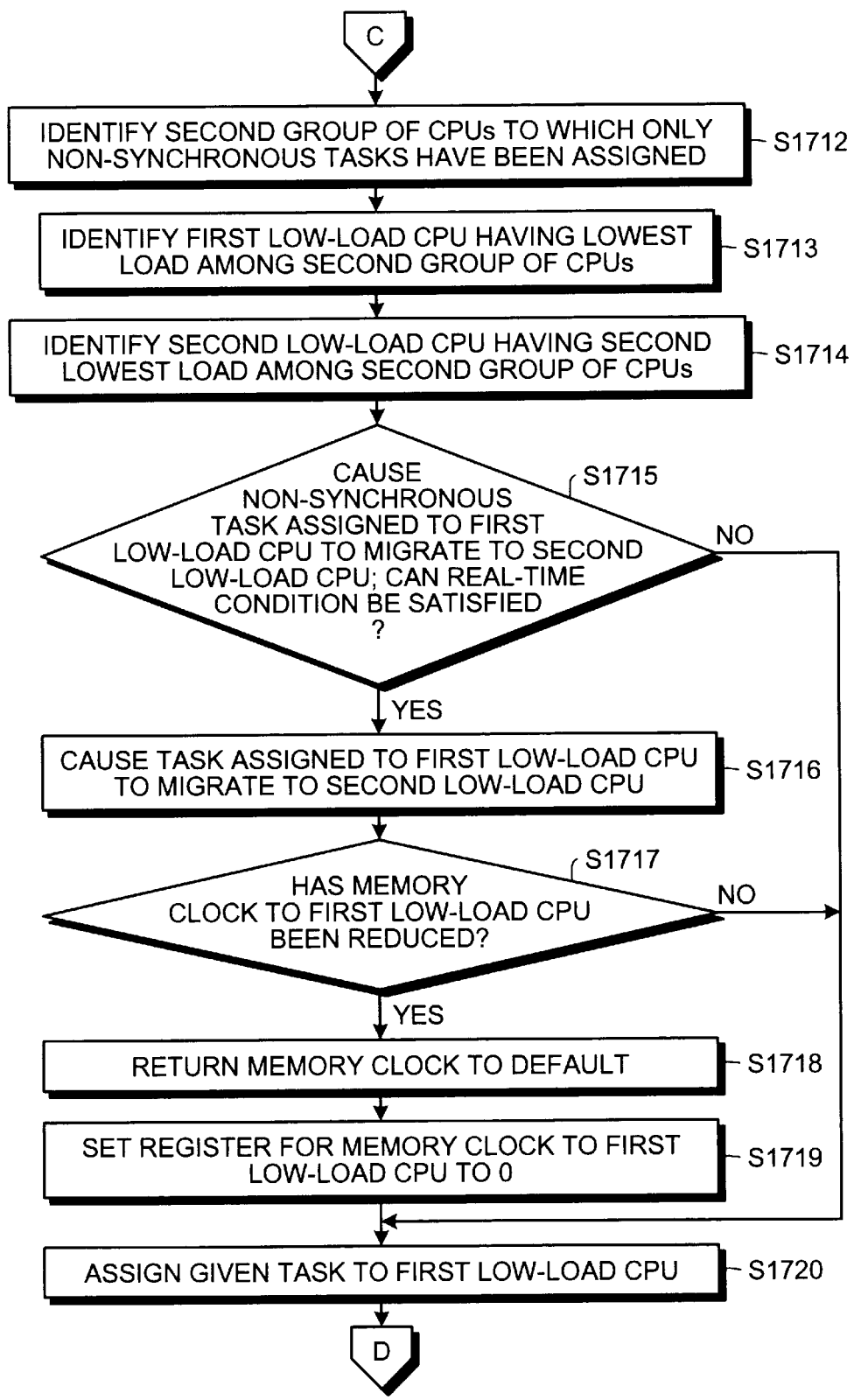
FIG. 19 is a third flowchart of the example of the control procedure by the scheduler 121 according to the second and third examples.
Figure 20:
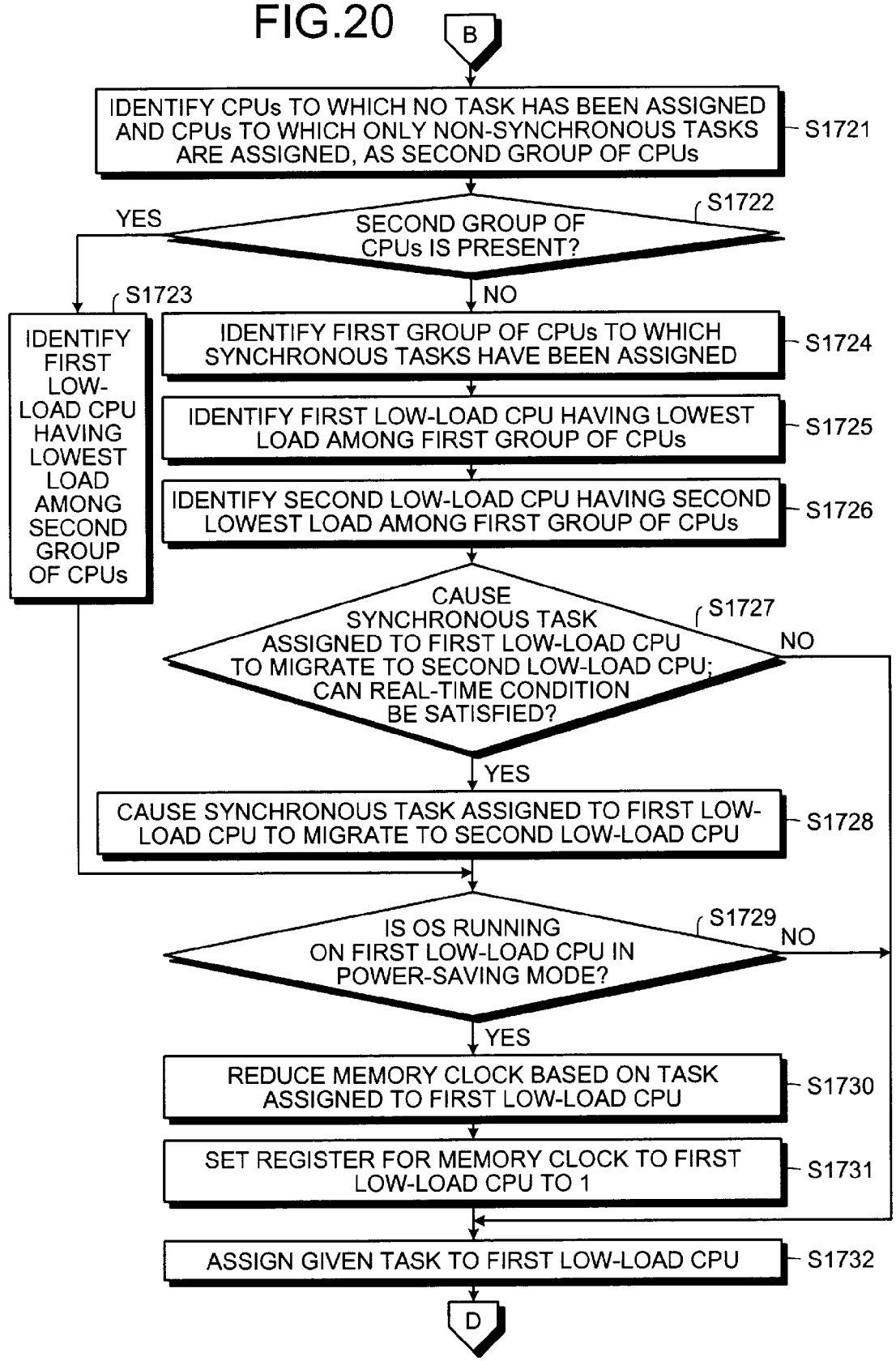
FIG. 20 is a fourth flowchart of the example of the control procedure by the scheduler 121 according to the second and third examples.

FIG. 16 is an explanatory diagram of an example in which the state of the task #1 changes from the operating state to the sleep state. In FIG. 16, when the task #1 is in the operating state, the task #1 is assigned to the CPU #0, and the task #2 and the task #4 (indicated by a dotted line as the task #4 before migration) are assigned to the CPU #1. The task #6 is assigned to the CPU #2, and the task #7 is assigned to the CPU #3. Because the tasks #2 and #4 are both synchronous tasks, they are assigned to the same CPU.

It is assumed that the state of the task #1 has changed from the operating state to the sleep state. The scheduler 121 detects the change of the task #1 from the operating state to the sleep state, and refers to the synchronization table 132 to identify a synchronous task to be synchronized with the task #1. In the synchronization table 132, the tasks #0 and #2 are found to be synchronous tasks to be synchronized with the task #1. Since the task #0 is not started in this example, only the task #2 is identified.

The scheduler 121 reads from the synchronization table 132, a value for the synchronization suspend event field 303 for a case where the task name in the task field 301 is task #2 and the task name in the synchronized task field 302 is task #1. In this example, "sleep" is read as the value for the synchronization suspend event field 303. Upon reading out "sleep" as the value for the synchronization suspend event field 303 as the task #1 is in the sleep state, the scheduler 121 determines that the task #2 as a synchronous task has changed into a non-synchronous task.

Thus, the task #2 as a non-synchronous task and the task #4 as a synchronous task are assigned to the same CPU #1. For this reason, the scheduler 121 carries out task reassignment. For example, the scheduler 121 identifies among the CPUs #0 to #3, a CPU to which no synchronous task has been assigned. In this example, the CPUs #2 and #3 are identified. The CPU #3 is assumed to have a load smaller than that of the CPU #2.

The scheduler 121 executes control to prevent simultaneous assignment of a synchronous task and a non-synchronous task to the same CPU and causes the task #4 to migrate from the CPU #1 to the identified CPU #3. Hence, only the task #2 as a non-synchronous task is assigned to the CPU #1 and the tasks #7 and #4 as synchronous tasks are assigned to the CPU #3.

FIGS. 17, 18, 19, and 20 are flowcharts of one example of a control procedure by the scheduler 121 according to the second and third examples. The scheduler 121 determines whether a change in the tasks assigned to the CPUs has been detected or an instruction for the start of a task has been received (step S1701). A change in the tasks assigned to the CPUs means, for example, the completion of a task or the occurrence of task dispatching or task switching. When the scheduler 121 determines that a change in the tasks assigned to the CPUs has not been detected and an instruction for the start of a task has not been received (step S1701: NO), the scheduler 121 returns to step S1701.

If the scheduler 121 determines that a change in the tasks assigned to the CPUs has been detected or an instruction for the start of a task has been received (step S1701: YES), scheduler 121 identifies the task assigned to the CPUs or the task for which the assignment instruction has been issued (step S1702). The scheduler 121 then determines whether an unselected task is included among identified tasks (step S1703). Upon determining that an unselected task is included among the identified tasks (step S1703: YES), the scheduler 121 selects, as a given task, an arbitrary task from among the unselected tasks (step S1704).

The scheduler 121 then determines whether a task to be synchronized with the given task is present (step S1705). Upon determining that a task to be synchronized with the given task is present (step S1705: YES), the scheduler 121 identifies, as a first group of CPUs, CPUs to which no task has been assigned and CPUs to which synchronous tasks has been assigned (step S1706).

The scheduler determines whether the first group of CPUs is present (step S1707). Upon determining that the first group of CPUs is present (step S1707: YES), the scheduler 121 identifies the CPU having the lowest load among the first group of CPUs (step S1708). Upon removing the identified low-load CPU from the first group of CPUs (step S1709) and assigning the given task to the identified low-load CPU, the scheduler determines whether a real-time condition can be satisfied (step S1710).

Upon determining that the real-time condition can be satisfied when the given task is assigned to the low-load CPU (step S1710: YES), the scheduler 121 assigns the given task to the low-load CPU (step S1711) and returns to step S1703. Upon determining that the real-time condition cannot be satisfied when the given task is assigned to the low-load CPU (step S1710: NO), the scheduler returns to step S1707.

Upon determining at step S1707 that the first group of CPUs is not present (step S1707: NO), the scheduler 121 identifies a second group of CPUs to which only non-synchronous tasks have been assigned (step S1712). The scheduler 121 identifies a first low-load CPU having the lowest load among the second group of CPUs (step S1713), and also identifies a second low-load CPU having the second lowest load among the second group of CPUs (step S1714).

The scheduler 121 then causes a non-synchronous task assigned to the first low-load CPU to migrate to the second low-load CPU and determines whether the real-time condition can be satisfied (step S1715). Upon determining that the real-time condition can be satisfied when causing the non-synchronous task assigned to the first low-load CPU to migrate to the second low-load CPU (step S1715: YES), the scheduler 121 proceeds to step S1716. Upon determining that the real-time condition cannot be satisfied when causing the non-synchronous task assigned to the first low-load CPU to migrate to the second low-load CPU (step S1715: NO), the scheduler proceeds to step S1720.

The scheduler 121 causes a task assigned to the first low-load CPU to migrate to the second low-load CPU (step S1716), and determines whether the memory clock to the first low-load CPU has been reduced (step S1717). Upon determining that the memory clock to the first low-load CPU has been reduced (step S1717: YES), the scheduler 121 sets the memory clock to the first low-load CPU back to the default clock (step S1718).

The scheduler 121 sets the register for the memory clock to the first low-load CPU to 0 (step S1719), assigns the given task to the first low-load CPU (step S1720), and returns to step S1703. Upon determining that the memory clock to the first low-load CPU has not been reduced (step S1717: NO), the scheduler 121 proceeds to step S1720.

Upon determining that a task to be synchronized with the given task is not present at step S1705 (step S1705: NO), the scheduler 121 identifies CPUs to which no task has been assigned and CPUs to which only non-synchronous tasks are assigned, as a second group of CPUs (step S1721). The scheduler 121 determines whether the second group of CPUs is present (step S1722). Upon determining that the second group of CPUs is present (step S1722: YES), the scheduler 121 identifies a first low-load CPU having the lowest load among the second group of CPUs (step S1723), and proceeds to step S1729.

Upon determining that the second group of CPUs is not present (step S1722: NO), the scheduler 121 identifies the first group of CPUs to which synchronous tasks have been assigned (step S1724). The scheduler 121 then identifies the first low-load CPU having the lowest load among the first group of CPUs (step S1725), and also identifies the second low-load CPU having the second lowest load among the first group of CPUs (step S1726).

The scheduler 121 causes a synchronous task assigned to the first low-load CPU to migrate to the second low-load CPU and determines whether the real-time condition can be satisfied (step S1727). Upon determining that the real-time condition cannot be satisfied when causing the synchronous task assigned to the first low-load CPU to migrate to the second low-load CPU (step S1727: NO), the scheduler 121 proceeds to step S1732.

Upon determining that the real-time condition can be satisfied when causing the synchronous task assigned to the first low-load CPU to migrate to the second low-load CPU (step S1727: YES), the scheduler 121 proceeds to step S1728. Subsequently, the scheduler 121 causes the synchronous task assigned to the first low-load CPU to migrate to the second low-load CPU at step S1728 (step S1728), and determines whether the OS running on the first low-load CPU is in the power-saving mode (step S1729).

Upon determining that the OS running on the first low-load CPU is not in the power-saving mode (step S1729: NO), the scheduler 121 proceeds to step S1732. Upon determining that the OS running on the first low-load CPU is in the power-saving mode (step S1729: YES), the scheduler 121 reduces the memory clock based on the task assigned to the first low-load CPU (step S1730).

The scheduler 121 sets the register for the memory clock to the first low-load CPU to 1 (step S1731), assigns the given task to the first low-load CPU (step S1732), and returns to step S1701.

Upon determining that an unselected task is not included among the identified tasks (step S1703: NO), the scheduler 121 returns to step S1701.

In the third example, the frequency of the clock supplied to the shared memory 103 and to the cache of a CPU is reduced. However, a source voltage supplied to the shared memory 103 and to the cache of a CPU may be reduced. The multi-core processor system 100 includes a power supply circuit (not depicted in FIG. 2) that supplies a source voltage to each of the component units.

When it is determined that a task to be synchronized with a given task is not present, the state determining unit 705 determines whether the CPU identified by the identifying unit 703 is in the power-saving mode.

When it is determined that the CPU identified by the identifying unit 703 is in the power-saving mode, the instruction-sending unit 706 sends to the power supply circuit, an instruction to reduce a source voltage value to a given value.

For example, it is assumed that a source voltage of 1.1 [V] must be supplied to the shared memory 103 and the cache of each CPU under the normal operation state. If a given CPU is in the power-saving mode and only the non-synchronous task is assigned to the CPU, the source voltage applied to the cache of the given CPU and the source voltage that is applied to the shared memory 103 while access of the shared memory 103 by the given CPU is permitted by the arbitration circuit 102 may be reduced to the given voltage. The given voltage is determined for each task, in advance by the designer.

As described above, according to the multi-core processor system, the control program, and the control method, control is carried out to prevent simultaneous assignment of a synchronous task to be synchronized with another task and a non-synchronizing task not synchronized with another task to the same CPU. This prevents a situation where a non-synchronous task stands by because of a synchronizing process on a synchronous task and thereby, prevents an increase in the execution time for the non-synchronous task and improves throughput by the CPU to which the non-synchronous task is assigned.

When a CPU to which no synchronous task has been assigned is not identified when a given task is a non-synchronous task, a synchronous task is caused to migrate from a given CPU to which the synchronous task is assigned, to another CPU to which another synchronous task is assigned. The given task is then assigned to the given CPU. In this manner, control is carried out to prevent simultaneous assignment of a synchronous task and a non-synchronizing task to the same CPU. Hence, a situation where a non-synchronous task stands by because of a synchronizing process on a synchronous task is prevented.

When a CPU to which no non-synchronous task has been assigned is not identified when a given task is a synchronous task, a non-synchronous task is caused to migrate from a given CPU to which the non-synchronous task is assigned, to another CPU to which another non-synchronous task is assigned. The given task is then assigned to the given CPU. In this manner, control is carried out to prevent simultaneous assignment of a synchronous task and a non-synchronizing task to the same CPU. Hence, a situation where a non-synchronous task stands by because of a synchronizing process on a synchronous task is prevented.

When the OS running on a CPU to which a non-synchronous task is assigned is in the power-saving mode, the clock supplied to the shared memory and to the cache of the CPU is reduced to reduce power consumption.

When the OS running on a CPU to which a non-synchronous task is assigned is in the power-saving mode, the source voltage supplied to the shared memory and to the cache of the CPU is reduced to reduce power consumption.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system that includes a plurality of cores one of which is configured to execute a process comprising:
    determining whether a task to be synchronized with a given task is present;
    identifying among the cores and upon determining that a task to be synchronized with the given task is present, a first core excluding cores to which a non-synchronous task that is not synchronized with another task has been assigned, and identifying among the cores and upon determining that a task to be synchronized with the given task is not present, a second core excluding cores to which a synchronous task to be synchronized with another task has been assigned;
    sending to the identified first or second core, an instruction to start the given task; and
    migrating a task assigned to a pre-migration core to a post-migration core after the identifying, wherein
    the identifying includes, upon determining that a task to be synchronized with the given task is present and not identifying the first core, identifying among the cores, a group of cores to which non-synchronous tasks have been assigned,
    the migrating includes migrating a non-synchronous task assigned to a third core among the identified group of cores to another core among the identified group of cores excluding the third core, and
    the sending includes, after the non-synchronous task assigned to the third core is migrated to another core, sending to the third core, the instruction to start the given task.

2. The multi-core processor system according to claim 1, wherein the process further includes migrating a task assigned to a pre-migration core to a post-migration core after the identifying, and
    the identifying includes, upon determining that a task to be synchronized with the given task is not present and not identifying the second core identifying among the cores a group of cores to which synchronous tasks have been assigned,
    the migrating includes migrating a synchronous task assigned to a third core among the identified group of cores to another core among the identified group of cores excluding the third core, and
    the sending includes, after the synchronous task assigned to the third core is migrated to another core, sending to the third core, the instruction to start the given task.

3. The multi-core processor system according to claim 1, further comprising:
    a memory device;
    a clock supply circuit that supplies a clock to the memory device; and
    a register capable of storing a value that indicates, for each of the cores, whether the core is in a power-saving mode, the core being capable of changing the value, wherein
    the process further includes determining, upon determining that a task to be synchronized with the given task is not present and based on the value stored in the register, whether the identified first or second core is in the power-saving mode, and
    the sending includes, upon determining that the identified first or second core is in the power-saving mode and a frequency of the clock is greater than a given value, sending to the clock supply circuit, an instruction to reduce the frequency of the clock to the given value.

4. The multi-core processor system according to claim 1, further comprising:
a memory device;
a power supply circuit that supplies a source voltage to the memory device; and
a register capable of storing a value that indicates, for each of the cores, whether the core is in a power-saving mode, the core being capable of changing the value, wherein
the process further includes determining, upon determining that a task to be synchronized with the given task is not present and based on the value stored in the register, whether the identified core is in the power-saving mode, and
the sending includes, upon determining that the identified first or second core is in the power-saving mode and a value of the source voltage is greater than a given value, sending to the power supply circuit, an instruction to reduce the value of the source voltage to the given value.

5. A computer-readable recording medium storing a program for a multi-core processor system that includes a plurality of cores, wherein the program causes one of the cores to execute a process comprising:
determining whether a task to be synchronized with a given task is present;
identifying among the cores and upon determining that a task to be synchronized with the given task is present, a first core excluding cores to which a non-synchronous task that is not synchronized with another task has been assigned, and identifying among the cores and upon determining that a task to be synchronized with the given task is not present, a second core excluding cores to which a synchronous task to be synchronized with another task has been assigned;
sending to the identified first or second core, an instruction to start the given task; and
migrating a task assigned to a pre-migration core to a post-migration core after the identifying, wherein
the identifying includes, upon determining that a task to be synchronized with the given task is present and not identifying the first core, identifying among the cores, a group of cores to which non-synchronous tasks have been assigned,
the migrating includes migrating a non-synchronous task assigned to a third core among the identified group of cores to another core among the identified group of cores excluding the third core, and
the sending includes, after the non-synchronous task assigned to the third core is migrated to another core, sending to the third core, the instruction to start the given task.

6. A control process for a multi-core processor system that includes a plurality of cores, wherein the method causes one of the cores to execute:
determining whether a task to be synchronized with a given task is present;
identifying among the cores and upon determining that a task to be synchronized with the given task is present, a first core excluding cores to which a non-synchronous task that is not synchronized with another task has been assigned, and identifying among the cores and upon determining that a task to be synchronized with the given task is not present, a second core excluding cores to which a synchronous task to be synchronized with another task has been assigned;
sending to the identified first or second core, an instruction to start the given task; and
migrating a task assigned to a pre-migration core to a post-migration core after the identifying, wherein
the identifying includes, upon determining that a task to be synchronized with the given task is present and not identifying the first core, identifying among the cores, a group of cores to which non-synchronous tasks have been assigned,
the migrating includes migrating a non-synchronous task assigned to a third core among the identified group of cores to another core among the identified group of cores excluding the third core, and
the sending includes, after the non-synchronous task assigned to the third core is migrated to another core, sending to the third core, the instruction to start the given task.

* * * * *